(12) United States Patent
Feng

(10) Patent No.: US 11,296,856 B2
(45) Date of Patent: Apr. 5, 2022

(54) METHOD FOR TRANSMITTING INFORMATION AND DEVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 15/772,439

(22) PCT Filed: Jan. 6, 2016

(86) PCT No.: PCT/CN2016/070279
§ 371 (c)(1),
(2) Date: Apr. 30, 2018

(87) PCT Pub. No.: WO2017/117744
PCT Pub. Date: Jul. 13, 2017

(65) Prior Publication Data
US 2018/0323950 A1    Nov. 8, 2018

(51) Int. Cl.
*H04W 72/12*    (2009.01)
*H04L 5/00*    (2006.01)
(Continued)

(52) U.S. Cl.
CPC .......... *H04L 5/1469* (2013.01); *H04L 1/1657* (2013.01); *H04L 1/1854* (2013.01);
(Continued)

(58) Field of Classification Search
CPC ... H04L 5/1469; H04L 1/1657; H04L 1/1854; H04L 1/1887; H04L 5/0055; H04L 5/143; H04W 72/0446; H04W 72/1205
See application file for complete search history.

(56) References Cited

U.S. PATENT DOCUMENTS 7,088,688 B2 *  8/2006  Kim .................... H04B 7/2656
                                                370/280
8,014,264 B2 *  9/2011  Li ........................ H04B 7/2656
                                                370/203
(Continued)

FOREIGN PATENT DOCUMENTS

CN    1224207 A    7/1999
CN    1402463 A    3/2003
(Continued)

OTHER PUBLICATIONS

International Search Report in international application No. PCT/CN2016/070279, dated Sep. 29, 2016.
(Continued)

*Primary Examiner* — Huy D Vu
*Assistant Examiner* — Bailor C. Hsu
(74) *Attorney, Agent, or Firm* — Ladas & Parry LLP

(57) ABSTRACT

Provided are a method for transmitting information and a device. The method comprises: a receiving end device receiving, within a first time unit, first information sent by a sending end device; and the receiving end device sending, within a second time unit, second information corresponding to the first information to the sending end device, wherein the duration of the first time unit is different from that of the second time unit. By means of the method for transmitting information in the embodiments of the present invention, when different transmission time intervals are used for an uplink and a downlink or a plurality of types of transmission time intervals are used for a communication system, rational scheduling and a time sequence fed back can be determined for devices at a receiving end and a sending end so as to ensure normal transmission of the information.

12 Claims, 6 Drawing Sheets

(51) Int. Cl.
*H04L 5/14* (2006.01)
*H04L 1/18* (2006.01)
*H04L 1/16* (2006.01)
*H04W 72/04* (2009.01)

(52) U.S. Cl.
CPC .......... *H04L 1/1887* (2013.01); *H04L 5/0055* (2013.01); *H04L 5/143* (2013.01); *H04W 72/0446* (2013.01); *H04W 72/1205* (2013.01)

(56) References Cited

U.S. PATENT DOCUMENTS

| | | | | |
|---|---|---|---|---|
| 8,239,723 | B2* | 8/2012 | Zhang | H04L 1/1812 714/749 |
| 8,594,057 | B2* | 11/2013 | Huang | H04W 72/04 370/229 |
| 8,605,748 | B2* | 12/2013 | Park | H04L 1/1854 370/470 |
| 9,515,696 | B2* | 12/2016 | Lee | H04L 5/16 |
| 9,722,760 | B2* | 8/2017 | Stern-Berkowitz | H04W 72/1289 |
| 10,021,545 | B2* | 7/2018 | Lee | H04B 7/15507 |
| 10,327,257 | B2* | 6/2019 | Nam | H04W 72/1278 |
| 2004/0042492 | A1 | 3/2004 | Suzuki | |
| 2009/0245190 | A1 | 10/2009 | Higuchi | |
| 2009/0262708 | A1 | 10/2009 | Johnson | |
| 2012/0207084 | A1* | 8/2012 | Seo | H04W 16/26 370/315 |
| 2012/0230216 | A1* | 9/2012 | Park | H04B 7/2656 370/252 |
| 2012/0275355 | A1* | 11/2012 | Park | H04W 72/042 370/281 |
| 2015/0163729 | A1* | 6/2015 | Seo | H04W 76/14 370/336 |
| 2015/0289202 | A1* | 10/2015 | Gao | H04W 48/20 370/280 |
| 2015/0333898 | A1 | 11/2015 | Ji et al. | |
| 2015/0334685 | A1 | 11/2015 | Ji et al. | |
| 2015/0334686 | A1 | 11/2015 | Ji et al. | |
| 2015/0334702 | A1 | 11/2015 | Ji et al. | |
| 2015/0334709 | A1 | 11/2015 | Ji et al. | |
| 2015/0334729 | A1 | 11/2015 | Ji et al. | |
| 2016/0329981 | A1* | 11/2016 | Chung | H04W 72/042 |
| 2017/0064706 | A1 | 3/2017 | Patel et al. | |
| 2017/0272296 | A1* | 9/2017 | Manolakos | H04W 76/28 |
| 2018/0205480 | A1* | 7/2018 | Akkarakaran | H04W 72/0446 |
| 2018/0234213 | A1 | 8/2018 | Han et al. | |

FOREIGN PATENT DOCUMENTS

| | | |
|---|---|---|
| CN | 101048988 A | 10/2007 |
| CN | 101292456 A | 10/2008 |
| CN | 101414900 A | 4/2009 |
| CN | 101507344 A | 8/2009 |
| CN | 104468030 A | 3/2015 |
| EP | 2056616 A1 | 5/2009 |
| JP | 2003179581 | 6/2003 |
| JP | 200853864 | 3/2008 |
| JP | 2010503334 A | 1/2010 |
| RU | 2472294 C2 | 1/2013 |
| WO | 2014052645 | 4/2014 |
| WO | 2017039889 A1 | 3/2017 |
| WO | 2017063570 A1 | 4/2017 |

OTHER PUBLICATIONS

Written Opinion of the International Search Authority in international application No. PCT/CN2016/070279, dated Sep. 29, 2016.
Mihyun Lee, et al.,Proposed A-MAP Relevance and HARQ Timing for the IEEE 802.16m Amendment (Design Principles and Key Features), IEEE C802.16m-09/1131,IEEE Internet<URL:http://www.ieee802.org/16/tgm/docs/C80216m-09_1131.pdf>,May 3, 2009.
ETRI, Discussion on TTI shortening[online], 3GPP TSG-RAN WG1#83 R1-157110, Internet<URL:http://www.3gpp.org/ftp/tsg_ran/WG1_RL1/TSGR1_83/Docs/R1-157110.zip>, Nov. 7, 2015.
Kenichi Kuri, et al., Long TTI operation for TDD frame structure related to HARQ timing (15.3.9.2.2.1), IEEE C802.16m-09/1730, IEEE Internet<URL:http://www.ieee802.org/16/tgm/docs/G80216m-09_1730.doc>, Aug. 29, 2009.
First Office Action of the Japanese application No. 2018-519047, dated Sep. 17, 2019.
First Office Action of the Chinese application No. 201680055312.X, dated Nov. 1, 2019.
Supplementary European Search Report in the European application No. 16882889.5, dated May 16, 2019.
Third Office Action of the Chinese application No. 201680055312.X, dated Mar. 18, 2020.
Notice of Allowance of the Chinese application No. 201680055312.X, dated Jun. 9, 2020.
Notice of Allowance of the Japanese application No. 2018-519047, dated Apr. 28, 2020.
First Office Action of the Russian application No. 2018120193, dated May 16, 2019.
Notice of Allowance of the Russian application No. 2018120193, dated Aug. 28, 2019.
Notice of Allowance of the European application No. 16882889.5, dated Mar. 3, 2020.
Second Office Action of the Chinese application No. 201680055312.X, dated Dec. 26, 2019.
Huawei: "TDD Performance comparison of lateney reduction schemes"3 GPP Draft; R2-102926 TDD Performance Comparison of Latency Reduction Schemes, 3rd Generation Partnership Project (3GPP), Mobile Competence Centre; 650, Route Des Lucioles; F-06921 Sophia-Antipolis Cedex; France, vol. RAN WG2, No. Montreal, Canada; May 10, 2010-May 14, 2010,May 4, 2010 (May 4, 2010) XP050605142, [ retrieved on May 4, 2010] p. 3; table 2.
Supplementary European Search Report in the European application No. 20184317.4, dated Oct. 26, 2020.
Ericsson, Huawei; "New SI proposal: Study on Latency reduction techniques for LTE", 3GPP TSG RAN Meeting #67, RP-150465, Shanghai, China, Mar. 9-12, 2015.
Office Action of the Indian application No. 201817018692, dated Jul. 1, 2020.
Written Opinion of the International Search Authority in the international application No. PCT/CN2016/070279, dated Sep. 29, 2016.
ZTE, "L1 considerations on latency reduction", 3GPP TSG RAN WG1 Meeting #83, R1-157151, Anaheim, USA. Nov. 15-22, 2015.
CMCC, "On TTI shortening for latency reduction", 3GPP TSG RAN WG1 Meeting #83 R1-157008, Anaheim, USA, Nov. 15-22, 2015.
Huawei, HiSilicon, "Views on TTI length", 3GPP TSG RAN WG1 Meeting #83 R1-156459, Anaheim, USA, Nov. 15-22, 2015.
First Office Action of the Japanese application No. 2020-03178, dated Jul. 2, 2021.
3GPP, "Study on latency reduction techniques for LTE TR 36.881 V0.5.0", Dec. 4, 2015, [cited Apr. 25, 2021], original file name: D3-R2-157181_36881-050. pdf, attached as: Published-Evidence-3. pdf.
Intel Corporation, "Discussion on TTI Shortening", 3GPP TSG RAN WG1 Meeting #83, RI-156540, Anaheim, USA, Nov. 15-22, 2015.
Ericsson, "Overview of TTI shortening", 3GPP TSG RAN WG1 Meeting #83, R1-157146, Anaheim, USA, Nov. 15-22, 2015.
Qualcomm Incorporated, "On physical layer aspects of low latency operation", 3GPP TSG RAN WG1 #83 R1-157082 Nov. 16-20, 2015, Anaheim, California, USA.
Notice of Opposition of the European application No. 16882889.5, dated May 11, 2021.
First Office Action of the Vietnamese application No. 1-2018-02206, dated May 31, 2021.

* cited by examiner

METHOD FOR TRANSMITTING INFORMATION AND DEVICE

RELATED APPLICATION

This application is an application under 35 U.S.C. 371 of International Application No. PCT/CN2016/070279 filed on Jan. 6, 2016, the entire contents of which are incorporated herein by reference.

TECHNICAL FIELD

Embodiments of the disclosure relate to the field of communications, and more particularly to an information transmission method and a device.

BACKGROUND

Along with continuous extension of an air interface technology and application, reducing a delay becomes one of key performance indicators in a future communication technology. For example, an end-to-end delay of real-time remote computing for mobile terminals is less than 10 ms, a delay of traffic efficiency and safety is required to be less than 5 ms, and a duration of a Transmission Time Interval (TTI) of the existing Long Term Evolution (LTE) is 1 ms.

A data processing and decoding delay is mainly related to a TTI. Therefore, one of key technologies for reducing a transmission delay is to shorten a TTI. At present, LTE-Advanced Release 13 (LTE-A Rel-13) has determined to start making researches on data transmission with a shorter TTI. However, compatibility with an existing LTE system is required to be ensured on a carrier supporting short-TTI transmission, that is, compatibility with a 1 ms TTI is simultaneously required. A short TTI has the advantage of shortening a transmission delay, but also has the corresponding cost of high control signaling overhead and low spectrum efficiency.

Considering that uplink and downlink service delay requirements may be different and coverage of uplink transmission may be relatively poor, a system may support use of different TTIs for uplink and downlink. Therefore, a method for determining a scheduling and feedback time sequence during use of different TTIs for uplink and downlink is required.

SUMMARY

The disclosure provides an information transmission method and a device, capable of determining a reasonable scheduling and feedback time sequence to ensure normal information transmission when different TTIs are used for uplink and downlink or a communication system adopts multiple TTIs.

A first aspect provides an information transmission method, which may include that: a receiving end device receives first information sent by a sending end device in a first time unit; and the receiving end device sends second information corresponding to the first information to the sending end device in a second time unit, wherein a duration of the first time unit may be different from a duration of the second time unit.

Therefore, according to the information transmission method of the embodiments of the disclosure, the receiving end device and the sending end device may determine a reasonable scheduling and feedback time sequence to ensure normal information transmission when different TTIs are used for uplink and downlink or a communication system adopts multiple TTIs.

In combination with the first aspect, in a first possible implementation mode of the first aspect, the second time unit may be a first one of second time units after a target time length since a starting moment of the first time unit, wherein the target time length may be an integral multiple of the duration of the first time unit.

Furthermore, when the communication system adopts a TTI shorter than a related art, the receiving end device and the sending end device may determine an optimal feedback time sequence according to the method of the embodiments of the disclosure.

In combination with the first aspect or the abovementioned implementation mode, in a second implementation mode of the first aspect, a subframe may include M first time units, an ending moment of an ith first time unit in the M first time units may be before a starting moment of an (i+1)th first time unit, or, the ending moment of the ith first time unit may be the starting moment of the (i+1)th first time unit, wherein M may be a positive integer more than or equal to 1, i may be set to be 0 when M is 1, and i may be a positive integer and 1≤i≤M−1 when M>1; and a subframe may include N second time units, an ending moment of a kth second time unit in the N second time units may be before a starting moment of a (k+1)th second time unit, or, the ending moment of the kth second time unit in the N second time units may be the starting moment of the (k+1)th second time unit, wherein N may be a positive integer more than or equal to 1, k may be set to be 0 when N is 1, and k may be a positive integer and 1≤k≤N−1 when N>1.

In combination with the second implementation mode of the first aspect, in a third implementation mode of the first aspect, when the method is applied to a Frequency Division duplexing (FDD) system, the value of N may be 1, and the value of M may be 2, wherein the operations that the receiving end device receives the first information sent by the sending end device in the first time unit and the receiving end device sends the second information corresponding to the first information to the sending end device in the second time unit may include at least one of the following: the receiving end device receives the first information in a first one of first time units in a subframe a, and the receiving end device sends the second information to the sending end device in a subframe a+2, a being a subframe index number; or, the receiving end device receives the first information in a second one of first time units in the subframe a, and the receiving end device sends the second information to the sending end device in a subframe a+3, a being the subframe index number.

In combination with the second implementation mode of the first aspect, in a fourth implementation mode of the first aspect, when the method is applied to the FDD system, the value of N may be 1, and M may be a positive integer more than or equal to 3, wherein the operations that the receiving end device receives the first information sent by the sending end device in the first time unit and the receiving end device sends the second information corresponding to the first information to the sending end device in the second time unit may include at least one of the following: the receiving end device receives the first information in any one of first M−3 first time units in the subframe a, and the receiving end device sends the second information to the sending end device in a subframe a+1, a being the subframe index number; or, the receiving end device receives the first information in any one of last three first time units in the subframe a, and the receiving end device sends the second information to the sending end device in the subframe a+2, a being the subframe index number.

In combination with the second implementation mode of the first aspect, in a fifth implementation mode of the first aspect, when the method is applied to the FDD system, the value of M may be 1, and N may be a positive integer more than or equal to 2, wherein the operations that the receiving end device receives the first information sent by the sending end device in the first time unit and the receiving end device sends the second information corresponding to the first information to the sending end device in the second time unit may include that: the receiving end device receives the first information in the subframe a; and the receiving end device sends the second information to the sending end device in a first one of second time units in a subframe a+4, a being the subframe index number.

In combination with the second implementation mode of the first aspect, in a sixth implementation mode of the first aspect, when the method is applied to the FDD system, the value of M may be 3, and N may be a positive integer more than or equal to 2, wherein the operations that the receiving end device receives the first information sent by the sending end device in the first time unit and the receiving end device sends the second information corresponding to the first information to the sending end device in the second time unit may include at least one of the following: the receiving end device receives the first information in the first one of first time units in the subframe a, and the receiving end device sends the second information to the sending end device in a second one of second time units in the subframe a+1, a being the subframe index number; or, the receiving end device receives the first information in the second one of first time units or third one of first time units in the subframe a, and the receiving end device sends the second information to the sending end device in a first one of second time units in the subframe a+2, a being the subframe index number.

In combination with the second implementation mode of the first aspect, in a seventh implementation mode of the first aspect, when the method is applied to the FDD system, the value of M may be 4, and N may be a positive integer more than or equal to 2, wherein the operations that the receiving end device receives the first information sent by the sending end device in the first time unit and the receiving end device sends the second information corresponding to the first information to the sending end device in the second time unit may include at least one of the following: the receiving end device receives the first information in the first one of first time units in the subframe a, and the receiving end device sends the second information to the sending end device in a first one of second time units in the subframe a+1, a being the subframe index number; the receiving end device receives the first information in the second one of first time units or third one of first time units in the subframe a, and the receiving end device sends the second information to the sending end device in the second one of second time units in the subframe a+1, a being the subframe index number; or, the receiving end device receives the first information in a fourth one of first time units in the subframe a, and the receiving end device sends the second information to the sending end device in the first one of second time units in the subframe a+2, a being the subframe index number.

In combination with the second implementation mode of the first aspect, in an eighth implementation mode of the first aspect, when the method is applied to the FDD system, M may be a positive integer more than or equal to 6, and N may be a positive integer more than or equal to 2, wherein the operations that the receiving end device receives the first information sent by the sending end device in the first time unit and the receiving end device sends the second information corresponding to the first information to the sending end device in the second time unit may include at least one of the following: the receiving end device receives the first information in any one of first M−3 first time units in the subframe a, and the receiving end device sends the second information to the sending end device in the first one of second time units in the subframe a+1, a being the subframe index number; or, the receiving end device receives the first information in any one of last three first time units in the subframe a, and the receiving end device sends the second information to the sending end device in the second one of second time units in the subframe a+1, a being the subframe index number.

In combination with the second possible implementation mode of the first aspect, in a ninth possible implementation mode of the first aspect, when the method is applied to a Time Division duplexing (TDD) system, the value of N may be 1, and the value of M may be 2, wherein the operations that the receiving end device receives the first information sent by the sending end device in the first time unit and the receiving end device sends the second information corresponding to the first information to the sending end device in the second time unit may include at least one of the following:

the method being applied to a TDD uplink/downlink configuration 0, the receiving end device receives the first information in the first one of first time units in the subframe a, and the receiving end device sends the second information to the sending end device in the subframe a+2, a being the subframe index number and a value of a being one of 0, 1, 5 or 6;

the method being applied to the TDD uplink/downlink configuration 0, the receiving end device receives the first information in the second one of first time units in the subframe a, and the receiving end device sends the second information to the sending end device in the subframe a+3, a being the subframe index number and the value of a being one of 0, 1, 5 or 6;

the method being applied to a TDD uplink/downlink configuration 1, the receiving end device receives the first information in the first one of first time units in the subframe a, and the receiving end, device sends the second information to the sending end device in the subframe a+3, a being the subframe index number and the value of a being 4 or 9;

the method being applied to the TDD uplink/downlink configuration 1, the receiving end device receives the first information in the second one of first time units in the subframe a, and the receiving end device sends the second information to the sending end device in the subframe a+3, a being the subframe index number and the value of a being one of 0, 4, 5 or 9;

the method being applied to the TDD uplink/downlink configuration 1, the receiving end device receives the first information in the first one of first time units in the subframe a, and the receiving end device sends the second information to the sending end device in the subframe a+2, a being the subframe index number and the value of a being one of 0, 1, 5 or 6;

the method being applied to the TDD uplink/downlink configuration 1, the receiving end device receives the first information in the second one of first time units in the subframe a, and the receiving end device sends the second information to the sending end device in the subframe a+3, a being the subframe index number and the value of a being 0 or 5;

the method being applied to the TDD uplink/downlink configuration 1, the receiving end device receives the first information in the second one of first time units in the subframe a, and the receiving end device sends the second information to the sending end device in a subframe a+6, a being the subframe index number and the value of a being 1 or 6;

the method being applied to a TDD uplink/downlink configuration 2, the receiving end device receives the first information in the first one of first time units in the subframe a, and the receiving end device sends the second information to the sending end device in the subframe a+2, a being the subframe index number and the value of a being 0 or 5;

the method being applied to the TDD uplink/downlink configuration 2, the receiving end device receives the first information in the second one of first time units in the subframe a, and the receiving end device sends the second information to the sending end device in a subframe a+7, a being the subframe index number and the value of a being 0 or 5;

the method being applied to the TDD uplink/downlink configuration 2, the receiving end device receives the first information in at least one of the first or second one of first time units in the subframe a, and the receiving end device sends the second information to the sending end device in the subframe a+6, a being the subframe index number and the value of a being 1 or 6;

the method being applied to the TDD uplink/downlink configuration 2, the receiving end device receives the first information in the at least one of the first or second one of first time units in the subframe a, and the receiving end device sends the second information to the sending end device in the subframe a+4, a being the subframe index number and the value of a being 3 or 8;

the method being applied to the TDD uplink/downlink configuration 2, the receiving end device receives the first information in the at least one of the first or second one of first time units in the subframe a, and the receiving end device sends the second information to the sending end device in the subframe a+3, a being the subframe index number and the value of a being 4 or 9;

the method being applied to a TDD uplink/downlink configuration 3, the receiving end device receives the first information in the at least one of the first or second one of first time units in the subframe a, and the receiving end device sends the second information to the sending end device in the subframe a+7, a being the subframe index number and the value of a being 5;

the method being applied to the TDD uplink/downlink configuration 3, the receiving end device receives the first information in the at least one of the first or second one of first time units in the subframe a, and the receiving end device sends the second information to the sending end device in the subframe a+6, a being the subframe index number and the value of a being 6;

the method being applied to the TDD uplink/downlink configuration 3, the receiving end device receives the first information in the at least one of the first or second one of first time units in the subframe a, and the receiving end device sends the second information to the sending end device in a subframe a+5, a being the subframe index number and the value of a being 7;

the method being applied to the TDD uplink/downlink configuration 3, the receiving end device receives the first information in the at least one of the first or second one of first time units in the subframe a, and the receiving end device sends the second information to the sending end device in the subframe a+4, a being the subframe index number and the value of a being 8;

the method being applied to the TDD uplink/downlink configuration 3, the receiving end device receives the first information in the at least one of the first or second one of first time units in the subframe a, and the receiving end device sends the second information to the sending end device in the subframe a+3, a being the subframe index number and the value of a being 9;

the method being applied to the TDD uplink/downlink configuration 3, the receiving end device receives the first information in the first one of first time units in the subframe a, and the receiving end device sends the second information to the sending end device in the subframe a+2, a being the subframe index number and the value of a being 0 or 1;

the method being applied to the TDD uplink/downlink configuration 3, the receiving end device receives the first information in the second one of first time units in the subframe a, and the receiving end device sends the second information to the sending end device in the subframe a+3, a being the subframe index number and the value of a being 0 or 1;

the method being applied to a TDD uplink/downlink configuration 4, the receiving end device receives the first information in the second one of first time units in the subframe a, and the receiving end device sends the second information to the sending end device in a subframe a+11, a being the subframe index number and the value of a being 1;

the method being applied to the TDD uplink/downlink configuration 4, the receiving end device receives the first information in the at least one of the first or second one of first time units in the subframe a, and the receiving end device sends the second information to the sending end device in a subframe a+8, a being the subframe index number and the value of a being 4;

the method being applied to the TDD uplink/downlink configuration 4, the receiving end device receives the first information in the at least one of the first or second one of first time units in the subframe a, and the receiving end device sends the second information to the sending end device in the subframe a+7, a being the subframe index number and the value of a being 5;

the method being applied to the TDD uplink/downlink configuration 4, the receiving end device receives the first information in the at least one of the first or second one of first time units in the subframe a, and the receiving end device sends the second information to the sending end device in the subframe a+6, a being the subframe index number and the value of a being 6;

the method being applied to the TDD uplink/downlink configuration 4, the receiving end device receives the first information in the at least one of the first or second one of first time units in the subframe a, and the receiving end device sends the second information to the sending end device in the subframe a+5, a being the subframe index number and the value of a being 7;

the method being applied to the TDD uplink/downlink configuration 4, the receiving end device receives the first information in the at least one of the first or second one of first time units in the subframe a, and the receiving end device sends the second information to the sending end device in the subframe a+4, a being the subframe index number and the value of a being 8;

the method being applied to the TDD uplink/downlink configuration 4, the receiving end device receives the first information in the at least one of the first or second one of first time units in the subframe a, and the receiving end device sends the second information to the sending end device in the subframe a+3, a being the subframe index number and the value of a being 9;

the method being applied to the TDD uplink/downlink configuration 4, the receiving end device receives the first information in the first one of first time units in the subframe a, and the receiving end device sends the second information to the sending end device in the subframe a+2, a being the subframe index number and the value of a being 0 or 1;

the method being applied to a TDD uplink/downlink configuration 5, the receiving end device receives the first information in the second one of first time units in the subframe a, and the receiving end device sends the second information to the sending end device in a subframe a+12, a being the subframe index number and the value of a being 0;

the method being applied to the TDD uplink/downlink configuration 5, the receiving end device receives the first information in the at least one of the first or second one of first time units in the subframe a, and the receiving end device sends the second information to the sending end device in the subframe a+11, a being the subframe index number and the value of a being 1;

the method being applied to the TDD uplink/downlink configuration 5, the receiving end device receives the first information in the at least one of the first or second one of first time units in the subframe a, and the receiving end device sends the second information to the sending end device in a subframe a+9, a being the subframe index number and the value of a being 3;

the method being applied to the TDD uplink/downlink configuration 5, the receiving end device receives the first information in the at least one of the first or second one of first time units in the subframe a, and the receiving end device sends the second information to the sending end device in the subframe a+8, a being the subframe index number and the value of a being 4;

the method being applied to the TDD uplink/downlink configuration 5, the receiving end device receives the first information in the at least one of the first or second one of first time units in the subframe a, and the receiving end device sends the second information to the sending end device in the subframe a+7, a being the subframe index number and the value of a being 5;

the method being applied to the TDD uplink/downlink configuration 5, the receiving end device receives the first information in the at least one of the first or second one of first time units in the subframe a, and the receiving end device sends the second information to the sending end device in the subframe a+6, a being the subframe index number and the value of a being 6;

the method being applied to the TDD uplink/downlink configuration 5, the receiving end device receives the first information in the at least one of the first or second one of first time units in the subframe a, and the receiving end device sends the second information to the sending end device in the subframe a+5, a being the subframe index number and the value of a being 7;

the method being applied to the TDD uplink/downlink configuration 5, the receiving end device receives the first information in the at least one of the first or second one of first time units in the subframe a, and the receiving end device sends the second information to the sending end device in the subframe a+4, a being the subframe index number and the value of a being 8;

the method being applied to the TDD uplink/downlink configuration 5, the receiving end device receives the first information in the at least one of the first or second one of first time units in the subframe a, and the receiving end device sends the second information to the sending end device in the subframe a+3, a being the subframe index number and the value of a being 9;

the method being applied to the TDD uplink/downlink configuration 5, the receiving end device receives the first information in the first one of first time units in the subframe a, and the receiving end device sends the second information to the sending end device in the subframe a+2, a being the subframe index number and the value of a being 0;

the method being applied to a TDD uplink/downlink configuration 6, the receiving end device receives the first information in the first one of first time units in the subframe a, and the receiving end device sends the second information to the sending end device in the subframe a+2, a being the subframe index number and the value of a being one of 0, 1, 5 or 6;

the method being applied to the TDD uplink/downlink configuration 6, the receiving end device receives the first information in the second one of first time units in the subframe a, and the receiving end device sends the second information to the sending end device in the subframe a+3, a being the subframe index number and the value of a being one of 0, 1 or 5;

the method being applied to the TDD uplink/downlink configuration 6, the receiving end device receives the first information in the second one of first time units in the subframe a, and the receiving end device sends the second information to the sending end device in the subframe a+6, a being the subframe index number and the value of a being 6;

or, the method being applied to the TDD uplink/downlink configuration 6, the receiving end device receives the first information in the at least one of the first or second one of first time units in the subframe a, and the receiving end device sends the second information to the sending end device in the subframe a+3, a being the subframe index number and the value of a being 9.

In combination with the first aspect and the abovementioned implementation modes thereof, in a tenth implementation mode of the first aspect, the operation that the receiving end device receives the first information sent by the sending end device in the first time unit may include that: the receiving end device receives downlink data sent by the sending end device on a Physical Downlink Shared Channel (PDSCH) in the first time unit, wherein the operation that the receiving end device sends the second information corresponding to the first information to the sending end device in the second time unit may include that: the receiving end device sends feedback information to the sending end device in the second time unit, the feedback information being configured to indicate whether the receiving end device successfully receives the downlink data or not.

In combination with the first aspect and the abovementioned implementation modes thereof, in an eleventh implementation mode of the first aspect, the operation that the receiving end device receives the first information sent by the sending end device in the first time unit may include that: the receiving end device receives downlink control signaling sent by the sending end device in the first time unit, the downlink control signaling being configured to schedule transmission of uplink data of the receiving end device, wherein the operation that the receiving end device sends the second information corresponding to the first information to the sending end device in the second time unit may include that: the receiving end device sends the uplink data to the sending end device on a Physical uplink Shared Channel (PUSCH) in the second time unit.

A second aspect provides an information transmission method, which may be characterized by including that: a sending end device sends first information to a receiving end device in a first time unit; and the sending end device receives second information corresponding to the first information from the receiving end device in a second time unit, wherein a duration of the first time unit may be different from a duration of the second time unit.

In combination with the second aspect, in a first possible implementation mode of the second aspect, the second time unit may be a first one of second time units after a target time length since a starting moment of the first time unit, wherein the target time length may be an integral multiple of the duration of the first time unit.

In combination with the second aspect or the abovementioned implementation mode, in a second implementation mode of the second aspect, a subframe may include M first time units, an ending moment of an ith first time unit in the M first time units may be before a starting moment of an (i+1)th first time unit, or, the ending moment of the ith first time unit may be the starting moment of the (i+1)th first time unit, wherein M may be a positive integer more than or equal to 1, i may be set to be 0 when M is 1, and i may be a positive integer and $1 \leq i \leq M-1$ when M>1; and a subframe may include N second time units, an ending moment of a kth second time unit in the N second time units may be before a starting moment of a (k+1)th second time unit, or, the ending moment of the kth second time unit in the N second time units may be the starting moment of the (k+1)th s second time unit, wherein N may be a positive integer more than or equal to 1, k may be set to be 0 when N is 1, and k may be a positive integer and $1 \leq k \leq N-1$ when N>1.

In combination with the second implementation mode of the second aspect, in a third implementation mode of the second aspect, when the method is applied to an FDD system, the value of N may be 1, and the value of M may be 2, wherein the operations that the sending end device sends the first information to the receiving end device in the first time unit and the sending end device receives the second information corresponding to the first information from the receiving end device in the second time unit may include at least one of the following: the sending end device sends the first information in a first one of first time units in a subframe a, and the sending end device receives the second information in a subframe a+2, a being a subframe index number; or, the sending end device sends the first information in a second one of first time units in the subframe a, and the sending end device receives the second information in a subframe a+3, a being the subframe index number.

In combination with the second implementation mode of the second aspect, in a fourth implementation mode of the second aspect, when the method is applied to the FDD system, the value of N may be 1, and M may be a positive integer more than or equal to 3, wherein the operations that the sending end device sends the first information to the receiving end device in the first time unit and the sending end device receives the second information corresponding to the first information from the receiving end device in the second time unit may include at least one of the following: the sending end device sends the first information in any one of first M−3 first time units in the subframe a, and the sending end device receives the second information in a subframe a+1, a being the subframe index number; or, the sending end device sends the first information in any one of last three first time units in the subframe a, and the sending end device receives the second information in the subframe a+2, a being the subframe index number.

In combination with the second implementation mode of the second aspect, in a fifth implementation mode of the second aspect, when the method is applied to the FDD system, the value of M may be 1, and N may be a positive integer more than or equal to 2, wherein the operations that the sending end device sends the first information to the receiving end device in the first time unit and the sending end device receives the second information corresponding to the first information from the receiving end device in the second time unit may include that: the sending end device sends the first information in the subframe a; and the sending end device receives the second information in a first one of second time units in a subframe a+4, a being the subframe index number.

In combination with the second implementation mode of the second aspect, in a sixth implementation mode of the second aspect, when the method is applied to the FDD system, the value of M may be 3, and N may be a positive integer more than or equal to 2, wherein the operations that the sending end device sends the first information to the receiving end device in the first time unit and the sending end device receives the second information corresponding to the first information from the receiving end device in the second time unit may include at least one of the following: the sending end device sends the first information in the first one of first time units in the subframe a, and the sending end device receives the second information in a second one of second time units in the subframe a+1, a being the subframe index number; or, the sending end device sends the first information in a second one of first time units or third one of first time units in the subframe a, and the sending end device receives the second information in a first one of second time units in the subframe a+2, a being the subframe index number.

In combination with the second implementation mode of the second aspect, in a seventh implementation mode of the second aspect, when the method is applied to the FDD system, the value of M may be 4, and N may be a positive integer more than or equal to 2, wherein the operations that the sending end device sends the first information to the receiving end device in the first time unit and the sending end device receives the second information corresponding to the first information from the receiving end device in the second time unit may include at least one of the following:

the sending end device sends the first information in the first one of first time units in the subframe a, and the sending end device receives the second information in a first one of second time units in the subframe a+1, a being the subframe index number; the sending end device sends the first information in the second one of first time units or third one of first time units in the subframe a, and the sending end device receives the second information in the second one of second time units in the subframe a+1, a being the subframe index number; or, the sending end device sends the first information in a fourth one of first time units in the subframe a, and the sending end device receives the second information in the first one of second time units in the subframe a+2, a being the subframe index number.

In combination with the second implementation mode of the second aspect, in an eighth implementation mode of the second aspect, when the method is applied to the FDD system, M may be a positive integer more than or equal to 6, and N may be a positive integer more than or equal to 2, wherein the operations that the sending end device sends the first information to the receiving end device in the first time unit and the sending end device receives the second information corresponding to the first information from the receiving end device in the second time unit may include at least one of the following: the sending end device sends the first information in any one of first M−3 first time units in the subframe a, and the sending end device receives the second information in the first one of second time units in the subframe a+1, a being the subframe index number; or, the sending end device sends the first information in any one of last three first time units in the subframe a, and the sending end device receives the second information in the second one of second time units in the subframe a+1, a being the subframe index number.

In combination with the second possible implementation mode of the second aspect, in a ninth possible implementation mode of the second aspect, when the method is applied to a TDD system, the value of N may be 1, and the value of M may be 2, wherein the operations that the sending end device sends the first information to the receiving end device in the first time unit and the sending end device receives the second information corresponding to the first information from the receiving end device in the second time unit may include at least one of the following:

the method being applied to a TDD uplink/downlink configuration 0, the sending end device sends the first information in the first one of first time units in the subframe a, and the sending end device receives the second information in the subframe a+2, a being the subframe index number and a value of a being one of 0, 1, 5 or 6;

the method being applied to the TDD uplink/downlink configuration 0, the sending end device sends the first information in the second one of first time units in the subframe a, and the sending end device receives the second information in the subframe a+3, a being the subframe index number and the value of a being one of 0, 1, 5 or 6;

the method being applied to a TDD uplink/downlink configuration 1, the sending end device sends the first information in the first one of first time units in the subframe a, and the sending end device receives the second information in the subframe a+3, a being the subframe index number and the value of a being 4 or 9;

the method being applied to the TDD uplink/downlink configuration 1, the sending end device sends the first information in the second one of first time units in the subframe a, and the sending end device receives the second information in the subframe a+3, a being the subframe index number and the value of a being one of 0, 4, 5 or 9;

the method being applied to the TDD uplink/downlink configuration 1, the sending end device sends the first information in the first one of first time units in the subframe a, and the sending end device receives the second information in the subframe a+2, a being the subframe index number and the value of a being one of 0, 1, 5 or 6;

the method being applied to the TDD uplink/downlink configuration 1, the sending end device sends the first information in the second one of first time units in the subframe a, and the sending end device receives the second information in the subframe a+3, a being the subframe index number and the value of a being 0 or 5;

the method being applied to the TDD uplink/downlink configuration 1, the sending end device sends the first information in the second one of first time units in the subframe a, and the sending end device receives the second information to the sending end device in a subframe a+6, a being the subframe index number and the value of a being 1 or 6;

the method being applied to a TDD uplink/downlink configuration 2, the sending end device sends the first information in the first one of first time units in the subframe a, and the sending end device receives the second information in the subframe a+2, a being the subframe index number and the value of a being 0 or 5;

the method being applied to the TDD uplink/downlink configuration 2, the sending end device sends the first information in at least one of the first or second one of first time units in the subframe a, and the sending end device receives the second information in the subframe a+6, a being the subframe index number and the value of a being 1 or 6;

the method being applied to the TDD uplink/downlink configuration 2, the sending end device sends the first information in the at least one of the first or second one of first time units in the subframe a, and the sending end device receives the second information in the subframe a+4, a being the subframe index number and the value of a being 3 or 8;

the method being applied to the TDD uplink/downlink configuration 2, the sending end device sends the first information in the at least one of the first or second one of first time units in the subframe a, and the sending end device receives the second information in the subframe a+3, a being the subframe index number and the value of a being 4 or 9;

the method being applied to a TDD uplink/downlink configuration 3, the sending end device sends the first information in the at least one of the first or second one of first time units in the subframe a, and the sending end device receives the second information in the subframe a+7, a being the subframe index number and the value of a being 5;

the method being applied to the TDD uplink/downlink configuration 3, the sending end device sends the first information in the at least one of the first or second one of first time units in the subframe a, and the sending end device receives the second information in the subframe a+6, a being the subframe index number and the value of a being 6;

the method being applied to the TDD uplink/downlink configuration 3, the sending end device sends the first information in the at least one of the first or second one of first time units in the subframe a, and the sending end device receives the second information in a subframe a+5, a being the subframe index number and the value of a being 7;

the method being applied to the TDD uplink/downlink configuration 3, the sending end device sends the first information in the at least one of the first or second one of first time units in the subframe a, and the sending end device receives the second information in the subframe a+4, a being the subframe index number and the value of a being 8;

the method being applied to the TDD uplink/downlink configuration 3, the sending end device sends the first information in the at least one of the first or second one of first time units in the subframe a, and the sending end device receives the second information in the subframe a+3, a being the subframe index number and the value of a being 9;

the method being applied to the TDD uplink/downlink configuration 3, the sending end device sends the first information in the first one of first time units in the subframe a, and the sending end device receives the second information in the subframe a+2, a being the subframe index number and the value of a being 0 or 1;

the method being applied to the TDD uplink/downlink configuration 3, the sending end device sends the first information in the second one of first time units in the subframe a, and the sending end device receives the second information in the subframe a+3, a being the subframe index number and the value of a being 0 or 1;

the method being applied to a TDD uplink/downlink configuration 4, the sending end device sends the first information in the second one of first time units in the subframe a, and the sending end device receives the second information in a subframe a+11, a being the subframe index number and the value of a being 1;

the method being applied to the TDD uplink/downlink configuration 4, the sending end device sends the first information in the at least one of the first or second one of first time units in the subframe a, and the sending end device receives the second information in a subframe a+8, a being the subframe index number and the value of a being 4;

the method being applied to the TDD uplink/downlink configuration 4, the sending end device sends the first information in the at least one of the first or second one of first time units in the subframe a, and the sending end device receives the second information in the subframe a+7, a being the subframe index number and the value of a being 5;

the method being applied to the TDD uplink/downlink configuration 4, the sending end device sends the first information in the at least one of the first or second one of first time units in the subframe a, and the sending end device receives the second information in the subframe a+6, a being the subframe index number and the value of a being 6;

the method being applied to the TDD uplink/downlink configuration 4, the sending end device sends the first information in the at least one of the first or second one of first time units in the subframe a, and the sending end device receives the second information in the subframe a+5, a being the subframe index number and the value of a being 7;

the method being applied to the TDD uplink/downlink configuration 4, the sending end device sends the first information in the at least one of the first or second one of first time units in the subframe a, and the sending end device receives the second information in the subframe a+4, a being the subframe index number and the value of a being 8;

the method being applied to the TDD uplink/downlink configuration 4, the sending end device sends the first information in the at least one of the first or second one of first time units in the subframe a, and the sending end device receives the second information in the subframe a+3, a being the subframe index number and the value of a being 9;

the method being applied to the TDD uplink/downlink configuration 4, the sending end device sends the first information in the first one of first time units the subframe a, and the sending end device receives the second information in the subframe a+2, a being the subframe index number and the value of a being 0 or 1;

the method being applied to a TDD uplink/downlink configuration 5, the sending end device sends the first information in the second one of first time units in the subframe a, and the sending end device receives the second information in a subframe a+12, a being the subframe index number and the value of a being 0;

the method being applied to the TDD uplink/downlink configuration 5, the sending end device sends the first information in the at least one of the first or second one of first time units in the subframe a, and the sending end device receives the second information in the subframe a+11, a being the subframe index number and the value of a being 1;

the method being applied to the TDD uplink/downlink configuration 5, the sending end device sends the first information in the at least one of the first or second one of first time units in the subframe a, and the sending end device receives the second information in a subframe a+9, a being the subframe index number and the value of a being 3;

the method being applied to the TDD uplink/downlink configuration 5, the sending end device sends the first information in the at least one of the first or second one of first time units in the subframe a, and the sending end device receives the second information in the subframe a+8, a being the subframe index number and the value of a being 4;

the method being applied to the TDD uplink/downlink configuration 5, the sending end device sends the first information in the at least one of the first or second one of first time units in the subframe a, and the sending end device receives the second information in the subframe a+7, a being the subframe index number and the value of a being 5;

the method being applied to the TDD uplink/downlink configuration 5, the sending end device sends the first information in the at least one of the first or second one of first time units in the subframe a, and the sending end device receives the second information in the subframe a+6, a being the subframe index number and the value of a being 6;

the method being applied to the TDD uplink/downlink configuration 5, the sending end device sends the first information in the at least one of the first or second one of first time units in the subframe a, and the sending end device receives the second information in the subframe a+5, a being the subframe index number and the value of a being 7;

the method being applied to the TDD uplink/downlink configuration 5, the sending end device sends the first information in the at least one of the first or second one of first time units in the subframe a, and the sending end device receives the second information in the subframe a+4, a being the subframe index number and the value of a being 8;

the method being applied to the TDD uplink/downlink configuration 5, the sending end device sends the first information in the at least one of the first or second one of first time units in the subframe a, and the sending end device receives the second information in the subframe a+3, a being the subframe index number and the value of a being 9;

the method being applied to the TDD uplink/downlink configuration 5, the sending end device sends the first information in the first one of first time units in the subframe a, and the sending end device receives the second information in the subframe a+2, a being the subframe index number and the value of a being 0;

the method being applied to a TDD uplink/downlink configuration 6, the sending end device sends the first information in the first one of first time units in the subframe a, and the sending end device receives the second information in the subframe a+2, a being the subframe index number and the value of a being one of 0, 1, 5 or 6;

the method being applied to the TDD uplink/downlink configuration 6, the sending end device sends the first information in the second one of first time units in the subframe a, and the sending end device receives the second information in the subframe a+3, a being the subframe index number and the value of a being one of 0, 1 or 5;

the method being applied to the TDD uplink/downlink configuration 6, the sending end device sends the first information in the second one of first time units in the subframe a, and the sending end device receives the second information in the subframe a+6, a being the subframe index number and the value of a being 6;

or, the method being applied to the TDD uplink/downlink configuration 6, the sending end device sends the first information in the at least one of the first or second one of first time units in the subframe a, and the sending end device receives the second information in the subframe a+3, a being the subframe index number and the value of a being 9.

In combination with the second aspect and the above-mentioned implementation modes thereof, in a tenth implementation mode of the second aspect, the operation that the sending end device sends the first information to the receiving end device in the first time unit may include that: the sending end device sends downlink data to the receiving end device on a PDSCH in the first time unit, wherein the operation that the sending end device receives the second information corresponding to the first information from the receiving end device in the second time unit may include that: the sending end device receives feedback information sent by the receiving end device in the second time unit, the feedback information being configured to indicate whether the receiving end device successfully receives the downlink data or not.

In combination with the second aspect and the above-mentioned implementation modes thereof, in an eleventh implementation mode of the second aspect, the operation that the sending end device sends the first information to the receiving end device in the first time unit may include that: the sending end device sends downlink control signaling to the receiving end device in the first time unit, the downlink control signaling being configured to schedule transmission of uplink data of the receiving end device, wherein the operation that the sending end device receives the second information corresponding to the first information from the receiving end device in the second time unit may include that: the sending end device receives the uplink data sent by the receiving end device on a PUSCH in the second time unit.

A third aspect provides receiving end device, which is configured to execute the method in the first aspect or any possible implementation mode of the first aspect. Specifically, the receiving end device includes units configured to execute the method in the first aspect or any possible implementation mode of the first aspect.

A fourth aspect provides sending end device, which is configured to execute the method in the second aspect or any possible implementation mode of the second aspect. Specifically, the sending end device includes units configured to execute the method in the second aspect or any possible implementation mode of the second aspect.

A fifth aspect provides a computer-readable medium, which is configured to store a computer program, the computer program including instructions configured to execute the method in the first aspect or any possible implementation of the first aspect.

A sixth aspect provides a computer-readable medium, which is configured to store a computer program, the computer program including instructions configured to execute the method in the second aspect or any possible implementation of the second aspect.

BRIEF DESCRIPTION OF DRAWINGS

In order to describe the technical solutions of the embodiments of the disclosure more clearly, the drawings used in the embodiments of the disclosure will be simply introduced below. Obviously, the drawings described below are only some embodiments of the disclosure. Other drawings may further be obtained by those skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art on the basis of the embodiments in the disclosure without creative work shall fall within the scope of protection of the disclosure.

Figure 1:
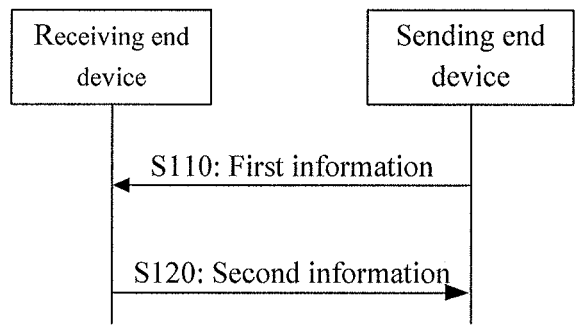
FIG. 1 is a schematic flowchart of an information transmission method according to an embodiment of the disclosure.

FIG. 1 is a schematic flowchart of an information transmission method 100 according to an embodiment of the disclosure. As illustrated in FIG. 1, the method 100 includes the following operations.

In S110, a sending end device sends first information to a receiving end device.

Specifically, the sending end device sends the first information to the receiving end device in a first time unit n (n is an index of the first time unit). A duration of the first time unit is a first TTI, and the receiving end device may determine the duration of the first time unit according to a system default rule, or the receiving end device may also determine the duration of the first time unit according to indication information sent by the sending end device.

In S120, the receiving end device sends second information for the first information to the sending end device.

Specifically, the receiving end device may send the second information for the first information to the sending end device in a second time unit k (k is an index of the second time unit) after receiving the first information sent by the sending end device. A duration of the second time unit is a second TTI, and the second TTI is different from the first TTI. The receiving end device may determine a time interval between the second time unit k and the first time unit n according to the system default rule, or may also determine the time interval between the second time unit k and the first time unit n according to the indication information sent by the sending end device.

Alternatively, as an embodiment, when the receiving end device is terminal equipment (or called as user equipment), the corresponding sending end device is a base station, and if the terminal equipment receives downlink data sent on a Physical Downlink Control Channel (PDCCH) in the first time unit n, the terminal equipment may send feedback information for indicating whether the terminal equipment successfully receives the downlink data to the base station in the second time unit k. The feedback information may be, for example, an Acknowledgement (ACK)/Negative ACK (NACK).

Alternatively, as an embodiment, when the receiving end device is a base station, the corresponding sending end device is terminal equipment. If the terminal equipment receives downlink control signaling for scheduling transmission of uplink data of the terminal equipment, for example, an uplink grant (UL Grant), from the base station in the first time unit n, the terminal equipment may send the uplink data to the base station in a PUSCH in the second time unit n.

Figure 2:
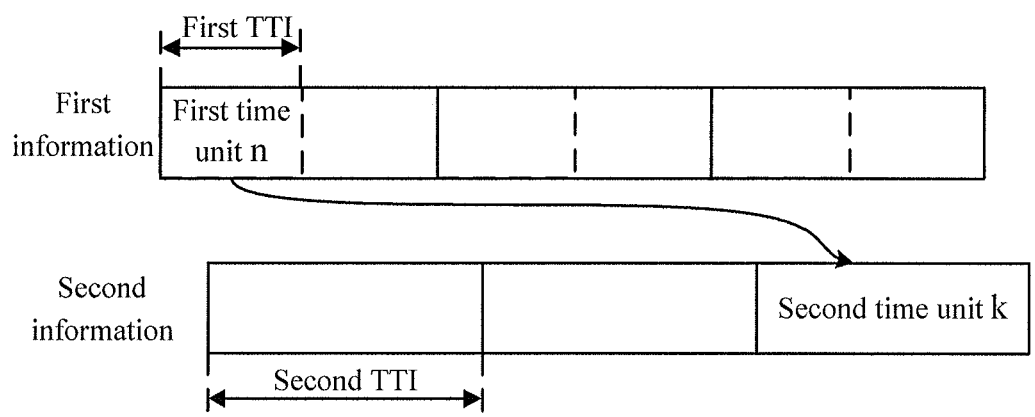
FIG. 2 is a schematic diagram of an information transmission time sequence according to an embodiment of the disclosure.

Alternatively, as an embodiment, the second time unit k is a first one of second time units after a target time length since a starting moment of the first time unit n, wherein the target time length is an integral multiple of the duration of the first time unit n. For example, as illustrated in FIG. 2, a time interval between a starting moment of the second time unit k and the starting moment of the first time unit n is 4 times the duration of the first time unit.

Alternatively, as an embodiment, a subframe includes M first time units, an ending moment of the ith first time unit in the M first time units is before a starting moment of the (i+1)th first time unit, or, the ending moment of the ith first time unit is the starting moment of the (i+1)th first time unit, wherein M is a positive integer more than or equal to 1, i is set to be 0 when M is 1, and i is a positive integer and 1≤i≤M−1 when M>1; and a subframe includes N second time units, an ending moment of the kth second time unit in the N second time units is before a starting moment of the (k+1)th second time unit, or, the ending moment of the kth second time unit in the N second time units is the starting moment of the (k+1)th second time unit, wherein N is a positive integer more than or equal to 1, k is set to be 0 when N is 1, and k is a positive integer and 1≤k≤N−1 when N>1.

That is, 1 ms duration of an existing subframe may include one or more first time units, and the 1 ms duration of the existing subframe may include one or more second time units.

Figure 3:
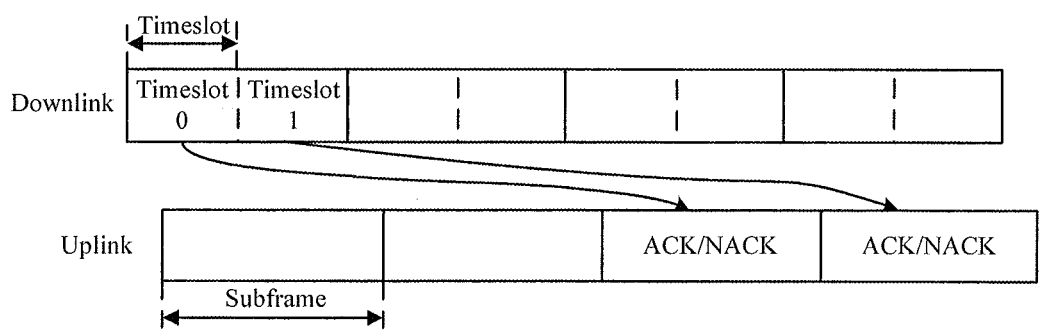
FIG. 3 is a schematic diagram of an information transmission time sequence in an FDD system according to another embodiment of the disclosure.

Specifically, as an embodiment, the value of N is 1, and the value of M is 2. That is, for an FDD system, the first time unit is an LTE timeslot, and the second time unit is an LTE subframe. As illustrated in FIG. 3, for example, for transmission of downlink data, the downlink data is transmitted in time unit of a timeslot, i.e., 0.5 ms TTI, and ACK/NACK information is transmitted in time unit of a subframe, i.e., 1 ms TTI. Assume that a processing delay specified by a system is N times a TTI corresponding to data transmission. When a value of N is 4, if the receiving end device receives the downlink data in a timeslot 0 of a subframe a, the ACK/NACK information corresponding to the downlink data is transmitted in a subframe a+2; and if the receiving end device receives the downlink data in a timeslot 1 of the subframe a, the ACK/NACK information corresponding to the downlink data is transmitted in a subframe a+3.

Figure 4:
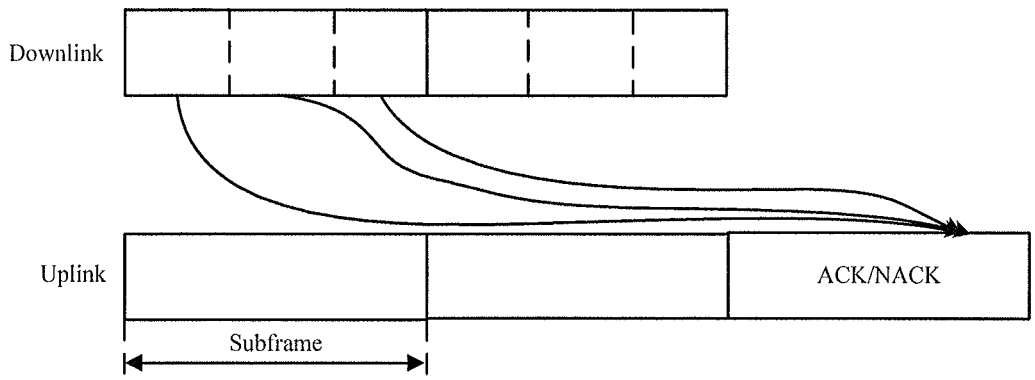
FIG. 4 is a schematic diagram of an information transmission time sequence in an FDD system according to another embodiment of the disclosure.

Alternatively, as an embodiment, the value of N is 1, and M is a positive integer more than or equal to 3. That is, for the FDD system, a subframe includes three or more than three first time units, and the second time unit is a subframe. As illustrated in FIG. 4, for example, for transmission of the downlink data, a subframe includes 3 time units (first time units) for transmitting the downlink data, and the ACK/NACK information is transmitted in time unit of a subframe, i.e., 1 ms subframe. The processing delay specified by the system is N times the ITT corresponding to data transmission, N being a positive integer, and if N=4, specific feedback time of the ACK/NACK information is illustrated in FIG. 4.

Figure 5:
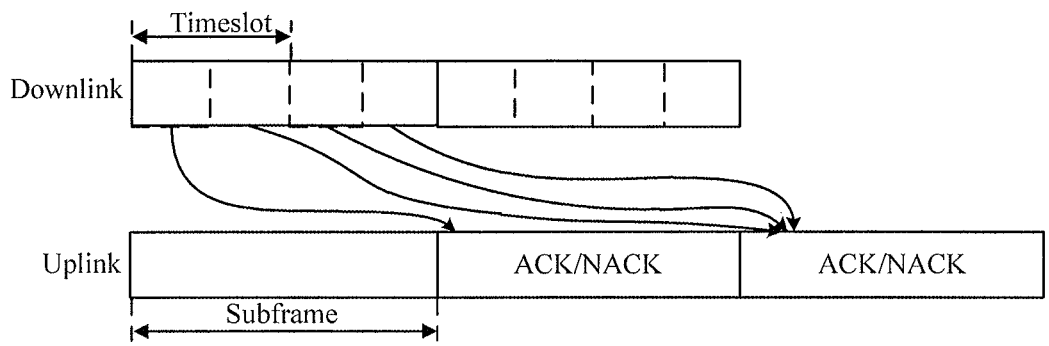
FIG. 5 is a schematic diagram of an information transmission time sequence in an FDD system according to another embodiment of the disclosure.

FIG. 5 is a schematic diagram of a downlink data and feedback information transmission time sequence when a timeslot includes two time units for transmitting downlink data and feedback information is transmitted in time unit of a subframe. Assume that the processing delay specified by the system is 4 times the TTI corresponding to data transmission. When the receiving end device receives the downlink data in a first one of first time units of the subframe a, the receiving end device sends feedback information (ACK/NACK) for the downlink data to the sending end device in a subframe a+1; and when the receiving end device receives the downlink data in a second or third or fourth one of first time units of the subframe a, the receiving end device sends the feedback information for the downlink data to the sending end device in the subframe a+2.

Figure 6:
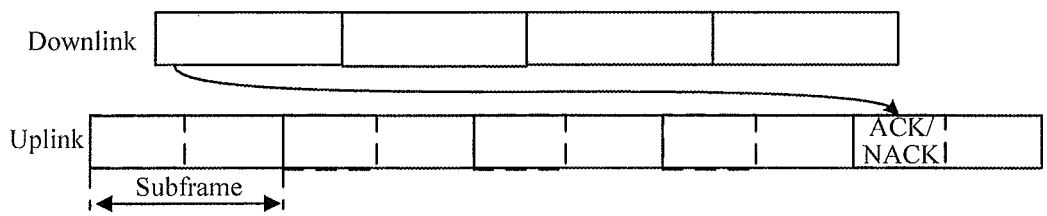
FIG. 6 is a schematic diagram of an information transmission time sequence in an FDD system according to another embodiment of the disclosure.

Alternatively, as an embodiment, the value of M is 1, and N is a positive integer more than or equal to 2. That is, for the FDD system, a subframe includes one first time unit, and a subframe includes at least two second time units. As illustrated in FIG. 6, for example, for transmission of the downlink data, assume that the processing delay specified by the system is 4 times the TTI corresponding to data transmission. When the receiving end device receives the downlink data in the subframe a, the receiving end device sends the feedback information (ACK/NACK) for the downlink data to the sending end device in a first one of second time units in a subframe a+4.

Figure 7:
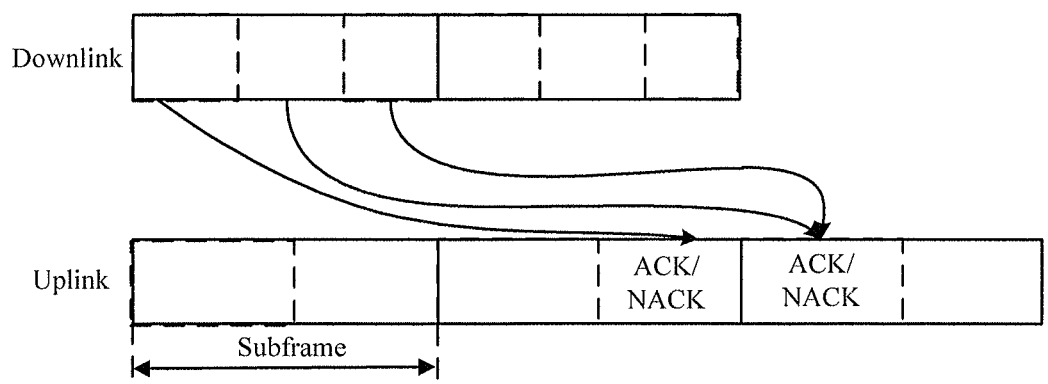
FIG. 7 is a schematic diagram of an information transmission time sequence in an FDD system according to another embodiment of the disclosure.

Alternatively, as an embodiment, for the FDD system, the value of M is 3, and N is a positive integer more than or equal to 2. As illustrated in FIG. 7, for example, for transmission of the downlink data, assume that the processing delay specified by the system is 4 times the TTI corresponding to data transmission. When the receiving end device receives the downlink data in the first one of first time units in the subframe a, the receiving end device sends the feedback information to the sending end device in a second one of second time units in the subframe a+1, a being a subframe index number; and/or, when the receiving end device receives the downlink data in the second one of first time units or third one of first time units in the subframe a, the receiving end device sends the feedback information to the sending end device in a first one of second time units in the subframe a+2, a being the subframe index number.

Figure 8:
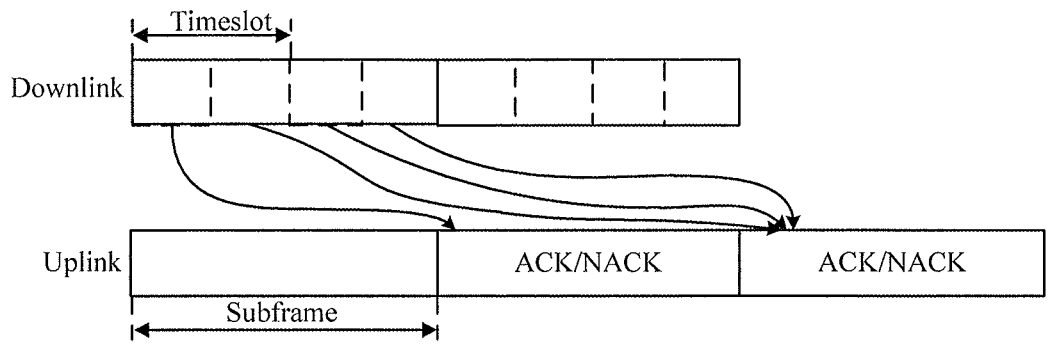
FIG. 8 is a schematic diagram of an information transmission time sequence in an FDD system according to another embodiment of the disclosure.

Alternatively, as an embodiment, for the FDD system, the value of M is 4, and N is a positive integer more than or equal to 2. For example, for transmission of the downlink data illustrated in FIG. 8, in FIG. 8, a subframe includes 4 first time units, and a subframe includes 2 second time units. Assume that the processing delay specified by the system is 4 times the TTI corresponding to data transmission. When the receiving end device receives the downlink data in the first one of first time units in the subframe a, the receiving end device sends the feedback information to the sending end device in a first one of second time units in the subframe a+1, a being a subframe index number; and/or, when the receiving end device receives the downlink data in the second one of first time units or third one of first time units in the subframe a, the receiving end device sends the second information to the sending end device in the second one of second time units in the subframe a+1, a being the subframe index number; and/or, when the receiving end device receives the downlink data in the fourth one of first time units in the subframe a, the receiving end device sends the feedback information to the terminal equipment in the first one of second time units in the subframe a+2, a being the subframe index number.

Figure 9:
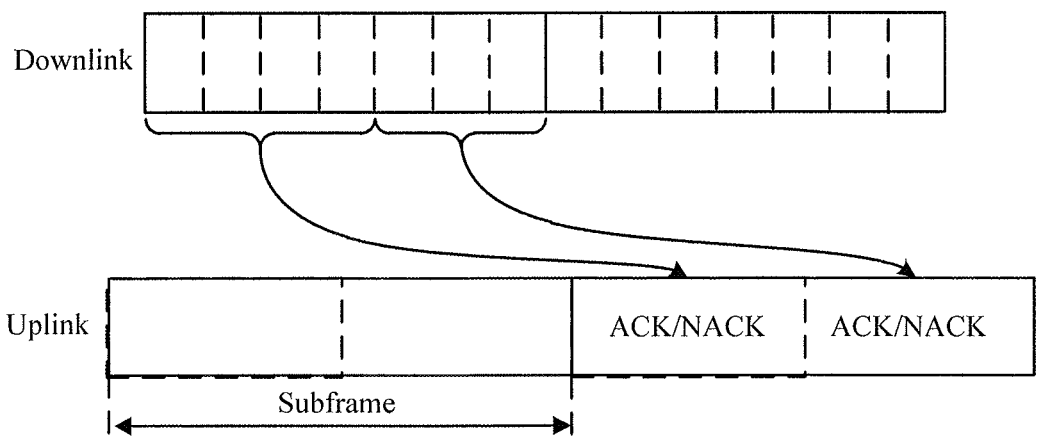
FIG. 9 is a schematic diagram of an information transmission time sequence in an FDD system according to a yet embodiment of the disclosure.

Alternatively, as an embodiment, for the FDD system, M is a positive integer more than or equal to 6, and N is a positive integer more than or equal to 2. For example, for transmission of the downlink data illustrated in FIG. 9, in FIG. 9, a subframe includes 7 first time units, and a subframe includes 2 second time units. Assume that the processing delay specified by the system is 4 times the TTI corresponding to data transmission. The receiving end device receives the downlink data in any one of first 4 first time units in the subframe a, and the receiving end device sends the feedback information to the sending end device in the first one of second time units in the subframe a+1, a being a subframe index number; and/or, the receiving end device receives the downlink data in any one of last 3 first time units in the subframe a, and the receiving end device sends the feedback information to the sending end device in the second one of second time units in the subframe a+1, a being the subframe index number.

Figure 10:
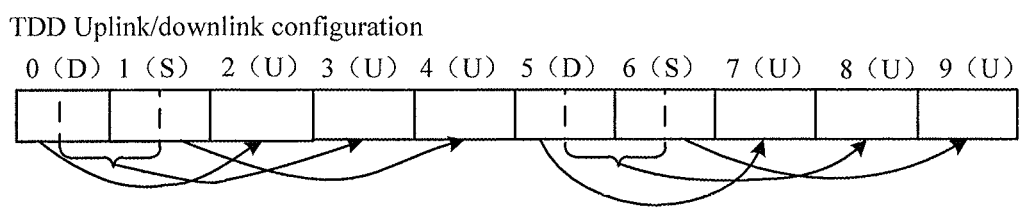
FIG. 10 is a schematic diagram of an information transmission time sequence in a TDD system according to an embodiment of the disclosure.

Alternatively, as an embodiment, for a TDD system, when an uplink/downlink configuration 0 is adopted, the value of N is 1, and the value of M is 2. As illustrated in FIG. 10, D represents a downlink subframe, S represents a special subframe, and U represents an uplink subframe. Assume that the processing delay specified by the system is 4 times the TTI corresponding to data transmission. When the receiving end device receives the first information in the first one of first time units in the subframe a, and the receiving end device sends the second information to the sending end device in the subframe a+2, a being the subframe index number and a value of a being one of 0, 1, 5 or 6; and/or, the receiving end device receives the first information in the second one of first time units in the subframe a, and the receiving end device sends the second information to the sending end device in the subframe a+3, a being the subframe index number and the value of a being one of 0, 1, 5 or 6.

Figure 11:
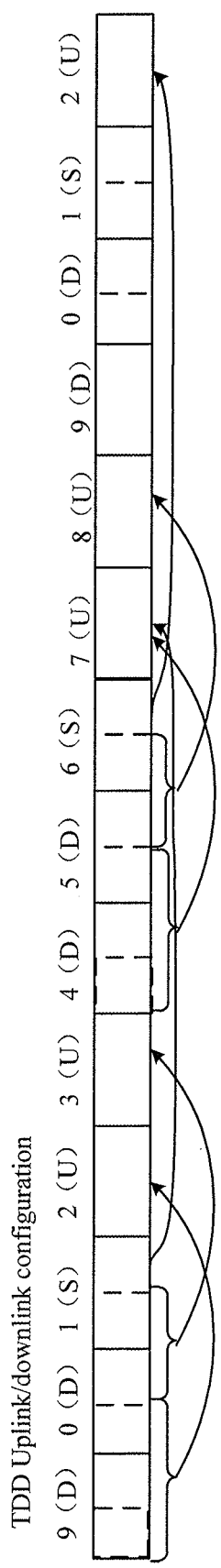
FIG. 11 is a schematic diagram of an information transmission time sequence in a TDD system according to another embodiment of the disclosure.

Or, for the TDD system, when an uplink/downlink configuration 1 is adopted, the value of N is 1, and the value of M is 2. As illustrated in FIG. 11, D represents a downlink subframe, S represents a special subframe, and U represents an uplink subframe. Assume that the processing delay specified by the system is 4 times the TTI corresponding to data transmission. The receiving end device receives the first information in the first one of first time units in the subframe a, and the receiving end device sends the second information to the sending end device in the subframe a+3, a being the subframe index number and the value of a being 4 or 9; and/or, the receiving end device receives the first information in the second one of first time units in the subframe a, and the receiving end device sends the second information to the sending end device in the subframe a+3, a being the subframe index number and the value of a being one of 0, 4, 5 or 9; and/or, the receiving end device receives the first information in the first one of first time units in the subframe a, and the receiving end device sends the second information to the sending end device in the subframe a+2, a being the subframe index number and the value of a being one of 0, 1, 5 or 6; and/or, the receiving end device receives the first information in the second one of first time units in the subframe a, and the receiving end device sends the second information to the sending end device in the subframe a+3, a being the subframe index number and the value of a being 0 or 5; and/or, the receiving end device receives the first information in the second one of first time units in the subframe a, and the receiving end device sends the second information to the sending end device in a subframe a+6, a being the subframe index number and the value of a being 1 or 6.

Figure 12:
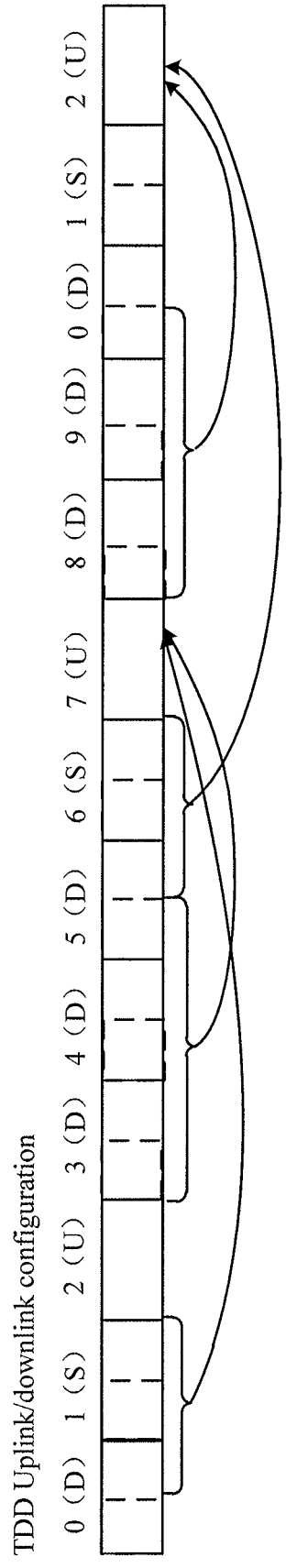
FIG. 12 is a schematic diagram of an information transmission time sequence in a TDD system according to another embodiment of the disclosure.

Or, for the TDD system, when the uplink/downlink configuration 1 is adopted, the value of N is 1, and the value of M is 2. As illustrated in FIG. 12, D represents a downlink subframe, S represents a special subframe, and U represents an uplink subframe. Assume that the processing delay specified by the system is 4 times the TTI corresponding to data transmission. The receiving end device receives the first information in the first one of first time units in the subframe a, and the receiving end device sends the second information to the sending end device in the subframe a+2, a being the subframe index number and the value of a being 0 or 5; and/or, the receiving end device receives the first information in the second one of first time units in the subframe a, and the receiving end device sends the second information to the sending end device in a subframe a+7, a being the subframe index number and the value of a being 0 or 5; and/or, the receiving end device receives the first information in at least one of the first or second one of first time units in the subframe a, and the receiving end device sends the second information to the sending end device in the subframe a+6, a being the subframe index number and the value of a being 1 or 6; and/or, the receiving end device receives the first information in at least one of the first or second one of first time units in the subframe a, and the receiving end device sends the second information to the sending end device in the subframe a+4, a being the subframe index number and the value of a being 3 or 8; and/or, the receiving end device receives the first information in at least one of the first or second one of first time units in the subframe a, and the receiving end device sends the second information to the sending end device in the subframe a+3, a being the subframe index number and the value of a being 4 or 9.

Figure 13:
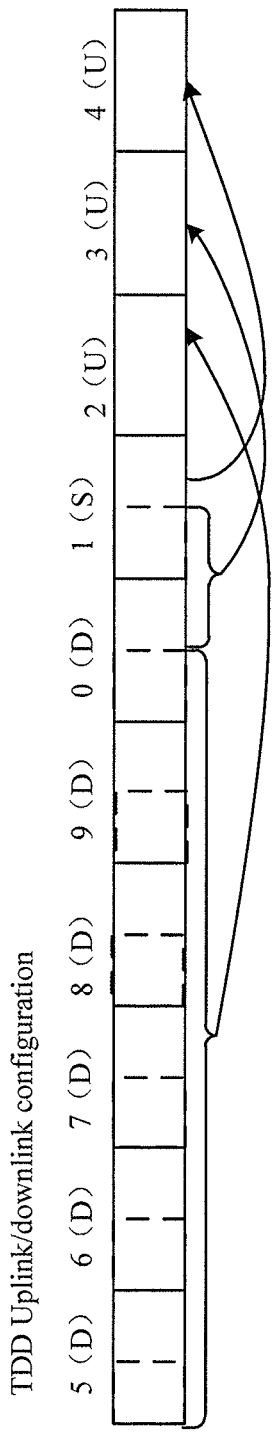
FIG. 13 is a schematic diagram of an information transmission time sequence in a TDD system according to another embodiment of the disclosure.

Or, for the TDD system, when the uplink/downlink configuration 1 is adopted, the value of N is 1, and the value of M is 2. As illustrated in FIG. 13, D represents a downlink subframe, S represents a special subframe, and U represents an uplink subframe. Assume that the processing delay specified by the system is 4 times the TTI corresponding to data transmission. The receiving end device receives the first information in at least one of the first or second one of first time units in the subframe a, and the receiving end device sends the second information to the sending end device in the subframe a+7, a being the subframe index number and the value of a being 5; and/or, the receiving end device receives the first information in at least one of the first or second one of first time units in the subframe a, and the receiving end device sends the second information to the sending end device in the subframe a+6, a being the subframe index number and the value of a being 6; and/or, the receiving end device receives the first information in at least one of the first or second one of first time units in the subframe a, and the receiving end device sends the second information to the sending end device in a subframe a+5, a being the subframe index number and the value of a being 7; and/or, the receiving end device receives the first information in at least one of the first or second one of first time units in the subframe a, and the receiving end device sends the second information to the sending end device in the subframe a+4, a being the subframe index number and the value of a being 8; and/or, the receiving end device receives the first information in at least one of the first or second one of first time units in the subframe a, and the receiving end device sends the second information to the sending end device in the subframe a+3, a being the subframe index number and the value of a being 9; and/or, the receiving end device receives the first information in the first one of first time units in the subframe a, and the receiving end device sends the second information to the sending end device in the subframe a+2, a being the subframe index number and the value of a being 0 or 1.

Figure 14:
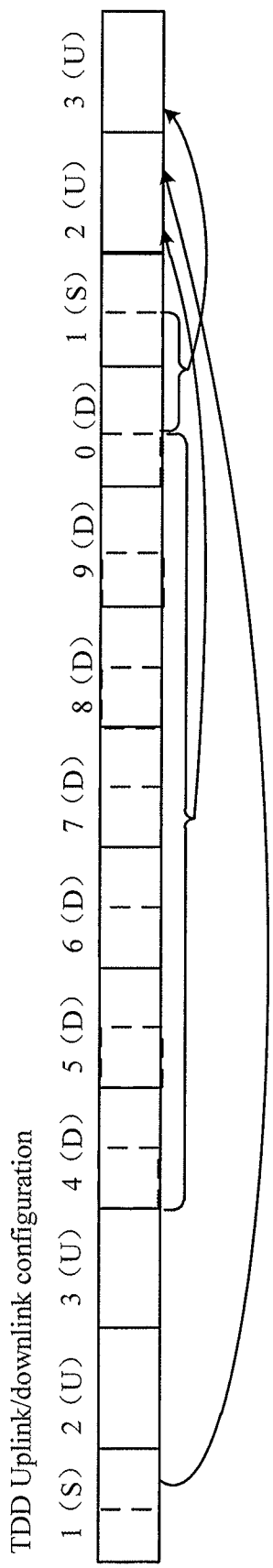
FIG. 14 is a schematic diagram of an information transmission time sequence in a TDD system according to another embodiment of the disclosure.

Or, for the TDD system, when the uplink/downlink configuration 1 is adopted, the value of N is 1, and the value of M is 2. As illustrated in FIG. 14, D represents a downlink subframe, S represents a special subframe, and U represents an uplink subframe. Assume that the processing delay specified by the system is 4 times the TTI corresponding to data transmission. The receiving end device receives the first information in the second one of first time units in the subframe a, and the receiving end device sends the second information to the sending end device in a subframe a+11, a being the subframe index number and the value of a being 1; and/or, the receiving end device receives the first information in at least one of the first or second one of first time units in the subframe a, and the receiving end device sends the second information to the sending end device in a subframe a+8, a being the subframe index number and the value of a being 4; and/or, the receiving end device receives the first information in at least one of the first or second one of first time units in the subframe a, and the receiving end device sends the second information to the sending end device in the subframe a+7, a being the subframe index number and the value of a being 5; and/or, the receiving end device receives the first information in at least one of the first or second one of first time units in the subframe a, and the receiving end device sends the second information to the sending end device in the subframe a+6, a being the subframe index number and the value of a being 6; and/or, the receiving end device receives the first information in at least one of the first or second one of first time units in the subframe a, and the receiving end device sends the second information to the sending end device in the subframe a+5, a being the subframe index number and the value of a being 7; and/or, the receiving end device receives the first information in at least one of the first or second one of first time units in the subframe a, and the receiving end device sends the second information to the sending end device in the subframe a+4, a being the subframe index number and the value of a being 8; and/or, the receiving end device receives the first information in at least one of the first or second one of first time units in the subframe a, and the receiving end device sends the second information to the sending end device in the subframe a+3, a being the subframe index number and the value of a being 9; and/or, the receiving end device receives the first information in the first one of first time units in the subframe a, and the receiving end device sends the second information to the sending end device in the subframe a+2, a being the subframe index number and the value of a being 0 or 1.

Figure 15:
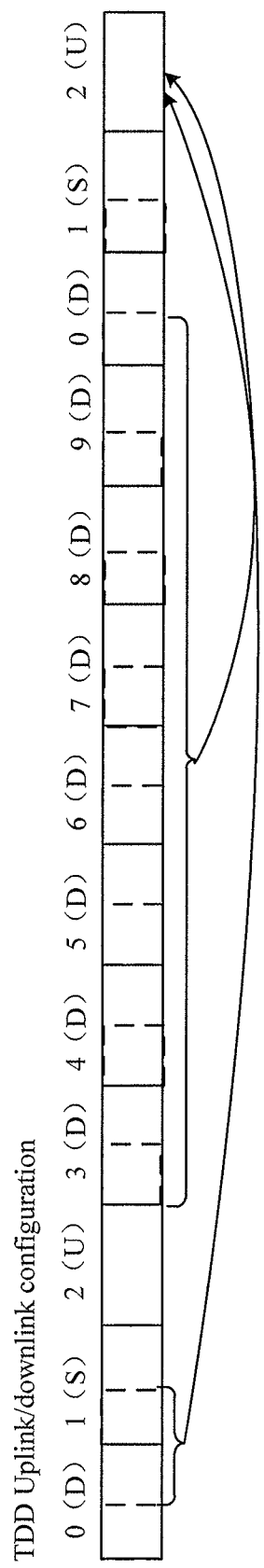
FIG. 15 is a schematic diagram of an information transmission time sequence in a TDD system according to another embodiment of the disclosure.

Or, for the TDD system, when the uplink/downlink configuration 1 is adopted, the value of N is 1, and the value of M is 2. As illustrated in FIG. 15, D represents a downlink subframe, S represents a special subframe, and U represents an uplink subframe. Assume that the processing delay specified by the system is 4 times the TTI corresponding to data transmission. The receiving end device receives the first information in the second one of first time units in the subframe a, and the receiving end device sends the second information to the sending end device in a subframe a+12, a being the subframe index number and the value of a being 0; and/or, the receiving end device receives the first information in at least one of the first or second one of first time units in the subframe a, and the receiving end device sends the second information to the sending end device in the subframe a+11, a being the subframe index number and the value of a being 1; and/or, the receiving end device receives the first information in at least one of the first or second one of first time units in the subframe a, and the receiving end device sends the second information to the sending end device in a subframe a+9, a being the subframe index number and the value of a being 3; and/or, the receiving end device receives the first information in at least one of the first or second one of first time units in the subframe a, and the receiving end device sends the second information to the sending end device in the subframe a+8, a being the subframe index number and the value of a being 4; and/or, the receiving end device receives the first information in at least one of the first or second one of first time units in the subframe a, and the receiving end device sends the second information to the sending end device in the subframe a+7, a being the subframe index number and the value of a being 5; and/or, the receiving end device receives the first information in at least one of the first or second one of first time units in the subframe a, and the receiving end device sends the second information to the sending end device in the subframe a+6, a being the subframe index number and the value of a being 6; and/or, the receiving end device receives the first information in at least one of the first or second one of first time units in the subframe a, and the receiving end device sends the second information to the sending end device in the subframe a+5, a being the subframe index number and the value of a being 7; and/or, the receiving end device receives the first information in at least one of the first or second one of first time units in the subframe a, and the receiving end device sends the second information to the sending end device in the subframe a+4, a being the subframe index number and the value of a being 8; and/or, the receiving end device receives the first information in at least one of the first or second one of first time units in the subframe a, and the receiving end device sends the second information to the sending end device in the subframe a+3, a being the subframe index number and the value of a being 9; and/or, the receiving end device receives the first information in the first one of first time units in the subframe a, and the receiving end device sends the second information to the sending end device in the subframe a+2, a being the subframe index number and the value of a being 0.

Figure 16:
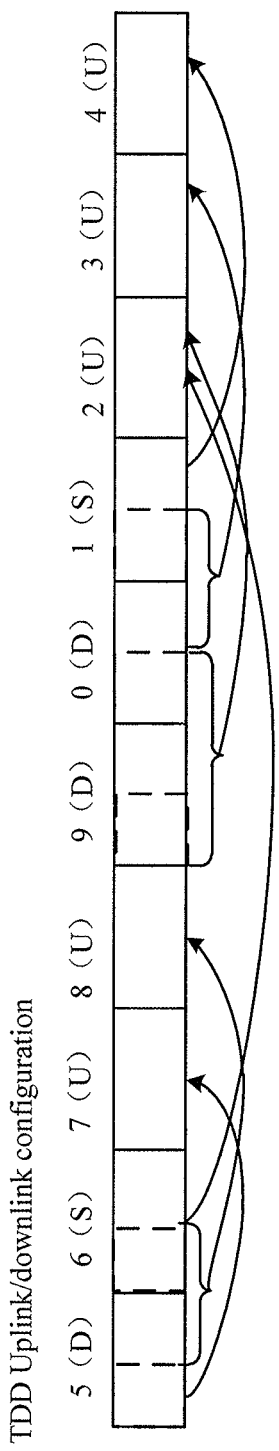
FIG. 16 is a schematic diagram of an information transmission time sequence in a TDD system according to a yet embodiment of the disclosure.

Or, for the TDD system, when the uplink/downlink configuration 1 is adopted, the value of N is 1, and the value of M is 2. As illustrated in FIG. 16, D represents a downlink subframe, S represents a special subframe, and U represents an uplink subframe. Assume that the processing delay specified by the system is 4 times the TTI corresponding to data transmission. The receiving end device receives the first information in the first one of first time units in the subframe a, and the receiving end device sends the second information to the sending end device in the subframe a+2, a being the subframe index number and the value of a being one of 0, 1, 5 or 6; and/or, the receiving end device receives the first information in the second one of first time units in the subframe a, and the receiving end device sends the second information to the sending end device in the subframe a+3, a being the subframe index number and the value of a being one of 0, 1, or 5; and/or, the receiving end device receives the first information in the second one of first time units in the subframe a, and the receiving end device sends the second information to the sending end device in the subframe a+6, a being the subframe index number and the value of a being 6; and/or, the receiving end device receives the first information in at least one of the first or second one of first time units in the subframe a, and the receiving end device sends the second information to the sending end device in the subframe a+3, a being the subframe index number and the value of a being 9.

It should be understood that, in the embodiments of the disclosure, descriptions are made only with the condition that the value of N is 1 and the value of M is 2 as an example, and a time sequence relationship between information reception and information sending when N and M are other values may be obtained according to the method described in the embodiments of the disclosure, which will not be elaborated herein.

Furthermore, in the embodiments of the disclosure, when multiple first time units correspond to one second time unit, the base station may send the uplink grants to the terminal equipment in the multiple first time units, and the terminal equipment may take the uplink grant received later as a reference when receiving multiple uplink grants. Or, the base station may transmit the uplink grant always by virtue of the last first time unit in the multiple first time units, which will not be limited in the disclosure.

Therefore, according to the information transmission method of the embodiment of the disclosure, the receiving end device and the sending end device may determine a reasonable scheduling and feedback time sequence to ensure normal information transmission when different TTIs are used for uplink and downlink or a communication system adopts multiple TTIs.

The information transmission method according to the embodiment of the disclosure has been described above in combination with FIG. 1 to FIG. 16 in detail, and a receiving end device 10 according to an embodiment of the disclosure will be described below in combination with FIG. 17.

Figure 17:
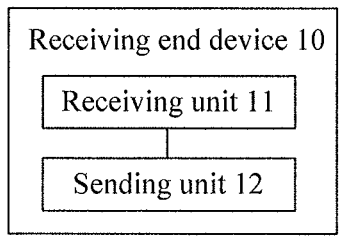
FIG. 17 is a schematic block diagram of a receiving end device according to an embodiment of the disclosure.

As illustrated in FIG. 17, the receiving end device 10 according to the embodiment of the disclosure includes:

a receiving unit 11, configured to receive first information sent by a sending end device in a first time unit; and a sending unit 12, configured to send second information corresponding to the first information to the sending end device in a second time unit, wherein a duration of the first time unit is different from a duration of the second time unit.

Therefore, the receiving end device of the embodiment of the disclosure may determine a reasonable scheduling and feedback time sequence to ensure normal information transmission when different TTIs are used for uplink and downlink or a communication system adopts multiple TTIs.

In the embodiment of the disclosure, alternatively, the second time unit is a first one of second time units after a target time length since a starting moment of the first time unit, wherein the target time length is an integral multiple of the duration of the first time unit.

In the embodiment of the disclosure, alternatively, a subframe includes M first time units, an ending moment of the ith first time unit in the M first time units is before a starting moment of the (i+1)th first time unit, or, the ending moment of the ith s first time unit is the starting moment of the (i+1)th first time unit, wherein M is a positive integer more than or equal to 1, i is set to be 0 when a value of M is 1, and i is a positive integer and $1 \le i \le M-1$ when M>1; and a subframe includes N second time units, an ending moment of the kth second time unit in the N second time units is before a starting moment of the (k+1)th second time unit, or, the ending moment of the kth second time unit in the N second time units is the starting moment of the (k+1)th second time unit, wherein N is a positive integer more than or equal to 1, k is valued to be 0 when a value of N is 1, and k is a positive integer and $1 \le k \le N-1$ when N>1.

In the embodiment of the disclosure, alternatively, when the receiving end device is applied to an FDD system, the value of N is 1, and the value of M is 2. The receiving unit 11 is specifically configured to receive the first information in a first one of first time units in a subframe a, and the sending unit 12 is specifically configured to send the second information to the sending end device in a subframe a+2, a being a subframe index number; and/or, the receiving unit 11 is specifically configured to receive the first information in a second one of first time units in the subframe a, and the sending unit 12 is specifically configured to send the second information to the sending end device in a subframe a+3, a being the subframe index number.

In the embodiment of the disclosure, alternatively, when the receiving end device is applied to the FDD system, the value of N is 1, and M is a positive integer more than or equal to 3. The receiving unit 11 is specifically configured to receive the first information in any one of first M−3 first time units in the subframe a, and the sending unit 12 is specifically configured to send the second information to the sending end device in a subframe a+1, a being the subframe index number; and/or, the receiving unit 11 is specifically configured to receive the first information in any one of last 3 first time units in the subframe a, and the sending unit 12 is specifically configured to send the second information to the sending end device in the subframe a+2, a being the subframe index number.

In the embodiment of the disclosure, alternatively, when the receiving end device is applied to the FDD system, the value of M is 1, and N is a positive integer more than or equal to 2. The receiving unit 11 is specifically configured to receive the first information in the subframe a; and the sending unit 12 is specifically configured to send the second information to the sending end device in a first one of second time units in a subframe a+4, a being the subframe index number.

In the embodiment of the disclosure, alternatively, when the receiving end device is applied to the FDD system, the value of M is 3, and N is a positive integer more than or equal to 2. The receiving unit 11 is specifically configured to receive the first information in the first one of first time units in the subframe a, and the sending unit 12 is specifically configured to send the second information to the sending end device in a second one of second time units in the subframe a+1, a being the subframe index number; and/or, the receiving unit 11 is specifically configured to receive the first information in the second one of first time units or third one of first time units in the subframe a, and the sending unit 12 is specifically configured to send the second information to the sending end device in a first one of second time units in the subframe a+2, a being the subframe index number.

In the embodiment of the disclosure, alternatively, when the receiving end device is applied to the FDD system, the value of M is 4, and N is a positive integer more than or equal to 2. The receiving unit 11 is specifically configured to receive the first information in the first one of first time units in the subframe a, and the sending unit 12 is specifically configured to send the second information to the sending end device in a first one of second time units in the subframe a+1, a being the subframe index number; and/or, the receiving unit 11 is specifically configured to receive the first information in the second one of first time units or third one of first time units in the subframe a, and the sending unit 12 is specifically configured to send the second information to the sending end device in the second one of second time units in the subframe a+1, a being the subframe index number; and/or, the receiving unit 11 is specifically configured to receive the first information in a fourth one of first time units in the subframe a, and the sending unit 12 is specifically configured to send the second information to the sending end device in the first one of second time units in the subframe a+2, a being the subframe index number.

In the embodiment of the disclosure, alternatively, when the receiving end device is applied to the FDD system, M is a positive integer more than or equal to 6, and N is a positive integer more than or equal to 2. The receiving unit 11 is specifically configured to receive the first information in any one of first M−3 first time units in the subframe a, and the sending unit 12 is specifically configured to send the second information to the sending end device in the first one of second time units in the subframe a+1, a being the subframe index number; and/or the receiving unit 11 is specifically configured to receive the first information in any one of last 3 first time units in the subframe a, and the sending unit 12 is specifically configured to send the second information to the sending end device in the second one of second time units in the subframe a+1, a being the subframe index number.

In the embodiment of the disclosure, alternatively, when the receiving end device is applied to a TDD system, the value of N is 1, and the value of M is 2, wherein the receiving end device being applied to a TDD uplink/downlink configuration 0, the receiving unit 11 is specifically configured to receive the first information in the first one of first time units in the subframe a, and the sending unit 12 is specifically configured to send the second information to the sending end device in the subframe a+2, a being the subframe index number and a value of a being one of 0, 1, 5 or 6;

and/or, the receiving end device being applied to the TDD uplink/downlink configuration 0, the receiving unit 11 is specifically configured to receive the first information in the second one of first time units in the subframe a, and the sending unit 12 is specifically configured to send the second information to the sending end device in the subframe a+3, a being the subframe index number and the value of a being one of 0, 1, 5 or 6;

and/or, the receiving end device being applied to a TDD uplink/downlink configuration 1, the receiving unit 11 is specifically configured to receive the first information in the first one of first time units in the subframe a, and the sending unit 12 is specifically configured to send the second information to the sending end device in the subframe a+3, a being the subframe index number and the value of a being 4 or 9;

and/or, the receiving end device being applied to the TDD uplink/downlink configuration 1, the receiving unit 11 is specifically configured to receive the first information in the second one of first time units in the subframe a, and the sending unit 12 is specifically configured to send the second information to the sending end device in the subframe a+3, a being the subframe index number and the value of a being one of 0, 4, 5 or 9;

and/or, the receiving end device being applied to the TDD uplink/downlink configuration 1, the receiving unit 11 is specifically configured to receive the first information in the first one of first time units in the subframe a, and the sending unit 12 is specifically configured to send the second information to the sending end device in the subframe a+2, a being the subframe index number and the value of a being one of 0, 1, 5 or 6;

and/or, the receiving end device being applied to the TDD uplink/downlink configuration 1, the receiving unit 11 is specifically configured to receive the first information in the second one of first time units in the subframe a, and the sending unit 12 is specifically configured to send the second information to the sending end device in the subframe a+3, a being the subframe index number and the value of a being 0 or 5;

and/or, the receiving end device being applied to the TDD uplink/downlink configuration 1, the receiving unit 11 is specifically configured to receive the first information in the second one of first time units in the subframe a, and the sending unit 12 is specifically configured to send the second information to the sending end device in a subframe a+6, a being the subframe index number and the value of a being 1 or 6;

and/or, the receiving end device being applied to a TDD uplink/downlink configuration 2, the receiving unit 11 is specifically configured to receive the first information in the first one of first time units in the subframe a, and the sending unit 12 is specifically configured to send the second information to the sending end device in the subframe a+2, a being the subframe index number and the value of a being 0 or 5;

and/or, the receiving end device being applied to the TDD uplink/downlink configuration 2, the receiving unit 11 is specifically configured to receive the first information in the second one of first time units in the subframe a, and the sending unit 12 is specifically configured to send the second information to the sending end device in a subframe a+7, a being the subframe index number and the value of a being 0 or 5;

and/or, the receiving end device being applied to the TDD uplink/downlink configuration 2, the receiving unit 11 is specifically configured to receive the first information in at least one of the first or second one of first time units in the subframe a, and the sending unit 12 is specifically configured to send the second information to the sending end device in the subframe a+6, a being the subframe index number and the value of a being 1 or 6;

and/or, the receiving end device being applied to the TDD uplink/downlink configuration 2, the receiving unit 11 is specifically configured to receive the first information in at least one of the first or second one of first time units in the subframe a, and the sending unit 12 is specifically configured to send the second information to the sending end device in the subframe a+4, a being the subframe index number and the value of a being 3 or 8;

and/or, the receiving end device being applied to the TDD uplink/downlink configuration 2, the receiving unit 11 is specifically configured to receive the first information in at least one of the first or second one of first time units in the subframe a, and the sending unit 12 is specifically configured to send the second information to the sending end device in the subframe a+3, a being the subframe index number and the value of a being 4 or 9;

and/or, the receiving end device being applied to a TDD uplink/downlink configuration 3, the receiving unit 11 is specifically configured to receive the first information in at least one of the first or second one of first time units in the subframe a, and the sending unit 12 is specifically configured to send the second information to the sending end device in the subframe a+7, a being the subframe index number and the value of a being 5;

and/or, the receiving end device being applied to the TDD uplink/downlink configuration 3, the receiving unit 11 is specifically configured to receive the first information in at least one of the first or second one of first time units in the subframe a, and the sending unit 12 is specifically configured to send the second information to the sending end device in the subframe a+6, a being the subframe index number and the value of a being 6;

and/or, the receiving end device being applied to the TDD uplink/downlink configuration 3, the receiving unit 11 is specifically configured to receive the first information in at least one of the first or second one of first time units in the subframe a, and the sending unit 12 is specifically configured to send the second information to the sending end device in a subframe a+5, a being the subframe index number and the value of a being 7;

and/or, the receiving end device being applied to the TDD uplink/downlink configuration 3, the receiving unit 11 is specifically configured to receive the first information in at least one of the first or second one of first time units in the subframe a, and the sending unit 12 is specifically configured to send the second information to the sending end device in the subframe a+4, a being the subframe index number and the value of a being 8;

and/or, the receiving end device being applied to the TDD uplink/downlink configuration 3, the receiving unit 11 is specifically configured to receive the first information in at least one of the first or second one of first time units in the subframe a, and the sending unit 12 is specifically configured to send the second information to the sending end device in the subframe a+3, a being the subframe index number and the value of a being 9;

and/or, the receiving end device being applied to the TDD uplink/downlink configuration 3, the receiving unit 11 is specifically configured to receive the first information in the first one of first time units in the subframe a, and the sending unit 12 is specifically configured to send the second information to the sending end device in the subframe a+2, a being the subframe index number and the value of a being 0 or 1;

and/or, the receiving end device being applied to the TDD uplink/downlink configuration 3, the receiving unit 11 is specifically configured to receive the first information in the second one of first time units in the subframe a, and the sending unit 12 is specifically configured to send the second information to the sending end device in the subframe a+3, a being the subframe index number and the value of a being 0 or 1;

and/or, the receiving end device being applied to a TDD uplink/downlink configuration 4, the receiving unit 11 is specifically configured to receive the first information in the second one of first time units in the subframe a, and the sending unit 12 is specifically configured to send the second information to the sending end device in a subframe a+11, a being the subframe index number and the value of a being 1;

and/or, the receiving end device being applied to the TDD uplink/downlink configuration 4, the receiving unit 11 is specifically configured to receive the first information in at least one of the first or second one of first time units in the subframe a, and the sending unit 12 is specifically configured to send the second information to the sending end device in a subframe a+8, a being the subframe index number and the value of a being 4;

and/or, the receiving end device being applied to the TDD uplink/downlink configuration 4, the receiving unit 11 is specifically configured to receive the first information in at least one of the first or second one of first time units in the subframe a, and the sending unit 12 is specifically configured to send the second information to the sending end device in the subframe a+7, a being the subframe index number and the value of a being 5;

and/or, the receiving end device being applied to the TDD uplink/downlink configuration 4, the receiving unit 11 is specifically configured to receive the first information in at least one of the first or second one of first time units in the subframe a, and the sending unit 12 is specifically configured to send the second information to the sending end device in the subframe a+6, a being the subframe index number and the value of a being 6;

and/or, the receiving end device being applied to the TDD uplink/downlink configuration 4, the receiving unit 11 is specifically configured to receive the first information in at least one of the first or second one of first time units in the subframe a, and the sending unit 12 is specifically configured to send the second information to the sending end device in the subframe a+5, a being the subframe index number and the value of a being 7;

and/or, the receiving end device being applied to the TDD uplink/downlink configuration 4, the receiving unit 11 is specifically configured to receive the first information in at least one of the first or second one of first time units in the subframe a, and the sending unit 12 is specifically configured to send the second information to the sending end device in the subframe a+4, a being the subframe index number and the value of a being 8;

and/or, the receiving end device being applied to the TDD uplink/downlink configuration 4, the receiving unit 11 is specifically configured to receive the first information in at least one of the first or second one of first time units in the subframe a, and the sending unit 12 is specifically configured to send the second information to the sending end device in the subframe a+3, a being the subframe index number and the value of a being 9;

and/or, the receiving end device being applied to the TDD uplink/downlink configuration 4, the receiving unit 11 is specifically configured to receive the first information in the first one of first time units in the subframe a, and the sending unit 12 is specifically configured to send the second information to the sending end device in the subframe a+2, a being the subframe index number and the value of a being 0 or 1;

and/or, the receiving end device being applied to a TDD uplink/downlink configuration 5, the receiving unit 11 is specifically configured to receive the first information in the second one of first time units in the subframe a, and the sending unit 12 is specifically configured to send the second information to the sending end device in a subframe a+12, a being the subframe index number and the value of a being 0;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in the subframe a+11, a being the subframe index number and the value of a being 1;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in a subframe a+9, a being the subframe index number and the value of a being 3;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in the subframe a+8, a being the subframe index number and the value of a being 4;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in the subframe a+7, a being the subframe index number and the value of a being 5;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in the subframe a+6, a being the subframe index number and the value of a being 6;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in the subframe a+5, a being the subframe index number and the value of a being 7;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in the subframe a+4, a being the subframe index number and the value of a being 8;

and/or, the receiving end device being applied to the TDD uplink/downlink configuration 5, the receiving unit 11 is specifically configured to receive the first information in at least one of the first or second one of first time units in the subframe a, and the sending unit 12 is specifically configured to send the second information to the sending end device in the subframe a+3, a being the subframe index number and the value of a being 9;

and/or, the receiving end device being applied to the TDD uplink/downlink configuration 5, the receiving unit 11 is specifically configured to receive the first information in the first one of first time units in the subframe a, and the sending unit 12 is specifically configured to send the second information to the sending end device in the subframe a+2, a being the subframe index number and the value of a being 0;

and/or, the receiving end device being applied to a TDD uplink/downlink configuration 6, the receiving unit 11 is specifically configured to receive the first information in the first one of first time units in the subframe a, and the sending unit 12 is specifically configured to send the second information to the sending end device in the subframe a+2, a being the subframe index number and the value of a being one of 0, 1, 5 or 6;

and/or, the receiving end device being applied to the TDD uplink/downlink configuration 6, the receiving unit 11 is specifically configured to receive the first information in the second one of first time units in the subframe a, and the sending unit 12 is specifically configured to send the second information to the sending end device in the subframe a+3, a being the subframe index number and the value of a being one of 0, 1 or 5;

and/or, the receiving end device being applied to the TDD uplink/downlink configuration 6, the receiving unit 11 is specifically configured to receive the first information in the second one of first time units in the subframe a, and the sending unit 12 is specifically configured to send the second information to the sending end device in the subframe a+6, a being the subframe index number and the value of a being 6;

and/or, the receiving end device being applied to the TDD uplink/downlink configuration 6, the receiving unit 11 is specifically configured to receive the first information in at least one of the first or second one of first time units in the subframe a, and the sending unit 12 is specifically configured to send the second information to the sending end device in the subframe a+3, a being the subframe index number and the value of a being 9.

In the embodiment of the disclosure, alternatively, the receiving unit 11 is specifically configured to receive downlink data sent by the sending end device on a PDSCH in the first time unit, wherein the sending unit 12 is specifically configured to send feedback information to the sending end device in the second time unit, the feedback information being configured to indicate whether the receiving end device successfully receives the downlink data or not.

In the embodiment of the disclosure, alternatively, the receiving unit 11 is specifically configured to receive downlink control signaling sent by the sending end device in the first time unit, the downlink control signaling being configured to schedule transmission of uplink data of the receiving end device, wherein the sending unit 12 is specifically configured to send the uplink data to the sending end device on a PUSCH in the second time unit.

It should be understood that the receiving end device 10 according to the embodiment of the disclosure may correspondingly execute the information transmission method 100 in the embodiments of the disclosure, and the above-mentioned and other operations and/or functions of each unit in the receiving end device 10 are intended to implement the corresponding flows executed by the receiving end device in the method illustrated in FIG. 1, and for briefness, will not be elaborated herein.

Figure 18:
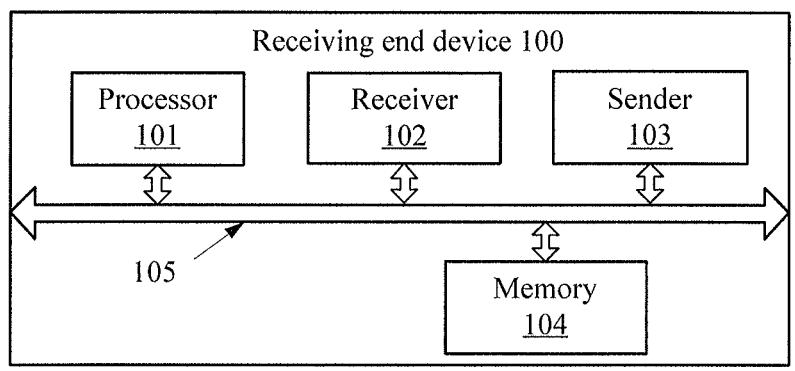
FIG. 18 is a schematic block diagram of a receiving end device according to another embodiment of the disclosure.

It is important to note that, in the embodiments of the disclosure, the receiving unit 11 may be implemented by a receiver, and the sending unit 12 may be implemented by a sender. As illustrated in FIG. 18, the receiving end device 100 may include a processor 101, a receiver 102, a sender 103 and a memory 104, wherein the memory 104 may be configured to store a code executed by the processor 101 and the like.

Each component in the receiving end device 100 is coupled together through a bus system 105, wherein the bus system 105 includes a data bus, and further includes a power bus, a control bus and a state signal bus.

It should be understood that the receiving end device 100 according to the embodiment of the disclosure may correspond to the receiving end device 10 in the embodiments of the disclosure, and may correspond to a corresponding body executing the method according to the embodiments of the disclosure, which, for briefness, will not be elaborated herein.

Figure 19:
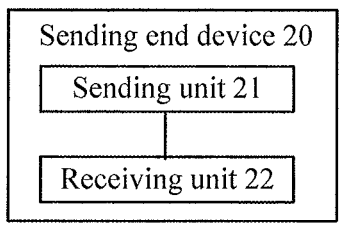
FIG. 19 is a schematic block diagram of a sending end device according to an embodiment of the disclosure.

FIG. 19 is a schematic block diagram of a sending end device 20 according to an embodiment of the disclosure. As illustrated in FIG. 19, the sending end device 20 includes:

a sending unit 21, configured to send first information to a receiving end device in a first time unit; and a receiving unit 22, configured to receive second information corresponding to the first information from the receiving end device in a second time unit, wherein a duration of the first time unit is different from a duration of the second time unit.

Therefore, the sending end device of the embodiment of the disclosure may determine a reasonable scheduling and feedback time sequence to ensure normal information transmission when different TTIs are used for uplink and downlink or a communication system adopts multiple TTIs.

In the embodiment of the disclosure, alternatively, the second time unit is a first one of second time units after a target time length since a starting moment of the first time unit, wherein the target time length is an integral multiple of the duration of the first time unit.

In the embodiment of the disclosure, alternatively, a subframe includes M first time units, an ending moment of the ith first time unit in the M first time units is before a starting moment of the (i+1)th first time unit, or, the ending moment of the ith first time unit is the starting moment of the (i+1)th first time unit, wherein M is a positive integer more than or equal to 1, i is valued to be 0 when M is 1, and i is a positive integer and $1 \le i \le M-1$ when M>1; and a subframe includes N second time units, an ending moment of the kth second time unit in the N second time units is before a starting moment of the (k+1)th second time unit, or, the ending moment of the kth second time unit in the N second time units is the starting moment of the (k+1)th second time unit, wherein N is a positive integer more than or equal to 1, k is valued to be 0 when a value of N is 1, and k is a positive integer and $1 \le k \le N-1$ when N>1.

In the embodiment of the disclosure, alternatively, when the sending end device is applied to an FDD system, the value of N is 1, and the value of M is 2. The sending unit 21 is specifically configured to send the first information in a first one of first time unitS in a subframe a, and the receiving unit 22 is specifically configured to receive the second information in a subframe a+2, a being a subframe index number; and/or, the sending unit 21 is specifically configured to send the first information in a second one of first time units in the subframe a, and the receiving unit 22 is specifically configured to receive the second information in a subframe a+3, a being the subframe index number.

In the embodiment of the disclosure, alternatively, the value of N is 1, and when the sending end device is applied to the FDD system, M is a positive integer more than or equal to 3. The sending unit 21 is specifically configured to send the first information in any one of first M−3 first time units in the subframe a, and the receiving unit 22 is specifically configured to receive the second information in a subframe a+1, a being the subframe index number; and/or, the sending unit 21 is specifically configured to send the first information in any one of last 3 first time units in the subframe a, and the receiving unit 22 is specifically configured to receive the second information in the subframe a+2, a being the subframe index number.

In the embodiment of the disclosure, alternatively, when the sending end device is applied to the FDD system, the value of M is 1, and N is a positive integer more than or equal to 2. The sending unit 21 is specifically configured to send the first information in the subframe a; and the receiving unit 22 is specifically configured to receive the second information in a first one of second time units in a subframe a+4, a being the subframe index number.

In the embodiment of the disclosure, alternatively, when the sending end device is applied to the FDD system, the value of M is 3, and N is a positive integer more than or equal to 2. The sending unit 21 is specifically configured to send the first information in the first one of first time units in the subframe a, and the receiving unit 22 is specifically configured to receive the second information in a second one of second time units in the subframe a+1, a being the subframe index number; and/or, the sending unit 21 is specifically configured to send the first information in the second one of first time units or third one of first time units in the subframe a, and the receiving unit 22 is specifically configured to receive the second information in a first one of second time units in the subframe a+2, a being the subframe index number.

In the embodiment of the disclosure, alternatively, when the sending end device is applied to the FDD system, the value of M is 4, and N is a positive integer more than or equal to 2. The sending unit 21 is specifically configured to send the first information in the first one of first time units in the subframe a, and the receiving unit 22 is specifically configured to receive the second information in a first one of second time units in the subframe a+1, a being the subframe index number; and/or, the sending unit 21 is specifically configured to send the first information in the second one of first time units or third one of first time units in the subframe a, and the receiving unit 22 is specifically configured to receive the second information in the second one of second time units in the subframe a+1, a being the subframe index number; and/or, the sending unit 21 is specifically configured to send the first information in a fourth one of first time units in the subframe a, and the receiving unit 22 is specifically configured to receive the second information in the first one of second time units in the subframe a+2, a being the subframe index number.

In the embodiment of the disclosure, alternatively, when the sending end device is applied to the FDD system, M is a positive integer more than or equal to 6, and N is a positive integer more than or equal to 2. The sending unit 21 is specifically configured to send the first information in any one of first M−3 first time units in the subframe a, and the receiving unit 22 is specifically configured to receive the second information in the first one of second time units in the subframe a+1, a being the subframe index number; and/or, the sending unit 21 is specifically configured to send the first information in any one of last 3 first time units in the subframe a, and the receiving unit 22 is specifically configured to receive the second information in the second one of second time units in the subframe a+1, a being the subframe index number.

In the embodiment of the disclosure, alternatively, when the sending end device is applied to a TDD system, the value of N is 1, and the value of M is 2, wherein the sending end device being applied to a TDD uplink/downlink configuration 0, the sending unit 21 is specifically configured to send the first information in the first one of first time units in the subframe a, and the receiving unit 22 is specifically configured to receive the second information in the subframe a+2, a being the subframe index number and a value of a being one of 0, 1, 5 or 6;

and/or, the sending end device being applied to the TDD uplink/downlink configuration 0, the sending unit 21 is specifically configured to send the first information in the second one of first time units in the subframe a, and the receiving unit 22 is specifically configured to receive the second information in the subframe a+3, a being the subframe index number and the value of a being one of 0, 1, 5 or 6;

and/or, the sending end device being applied to a TDD uplink/downlink configuration 1, the sending unit 21 is specifically configured to send the first information in the first one of first time units in the subframe a, and the receiving unit 22 is specifically configured to receive the second information in the subframe a+3, a being the subframe index number and the value of a being 4 or 9;

and/or, the sending end device being applied to the TDD uplink/downlink configuration 1, the sending unit 21 is specifically configured to send the first information in the second one of first time units in the subframe a, and the receiving unit 22 is specifically configured to receive the second information in the subframe a+3, a being the subframe index number and the value of a being one of 0, 4, 5 or 9;

and/or, the sending end device being applied to the TDD uplink/downlink configuration 1, the sending unit 21 is specifically configured to send the first information in the first one of first time units in the subframe a, and the receiving unit 22 is specifically configured to receive the second information in the subframe a+2, a being the subframe index number and the value of a being one of 0, 1, 5 or 6;

and/or, the sending end device being applied to the TDD uplink/downlink configuration 1, the sending unit 21 is specifically configured to send the first information in the second one of first time units in the subframe a, and the receiving unit 22 is specifically configured to receive the second information in the subframe a+3, a being the subframe index number and the value of a being 0 or 5;

and/or, the sending end device being applied to the TDD uplink/downlink configuration 1, the sending unit 21 is specifically configured to send the first information in the second one of first time units in the subframe a, and the receiving unit 22 is specifically configured to receive the second information to the sending end device in a subframe a+6, a being the subframe index number and the value of a being 1 or 6;

and/or, the sending end device being applied to a TDD uplink/downlink configuration 2, the sending unit 21 is specifically configured to send the first information in the first one of first time units in the subframe a, and the receiving unit 22 is specifically configured to receive the second information in the subframe a+2, a being the subframe index number and the value of a being 0 or 5;

and/or, the sending end device being applied to the TDD uplink/downlink configuration 2, the sending unit 21 is specifically configured to send the first information in at least one of the first or second one of first time units in the subframe a, and the receiving unit 22 is specifically configured to receive the second information in the subframe a+6, a being the subframe index number and the value of a being 1 or 6;

and/or, the sending end device being applied to the TDD uplink/downlink configuration 2, the sending unit 21 is specifically configured to send the first information in at least one of the first or second one of first time units in the subframe a, and the receiving unit 22 is specifically configured to receive the second information in the subframe a+4, a being the subframe index number and the value of a being 3 or 8;

and/or, the sending end device being applied to the TDD uplink/downlink configuration 2, the sending unit 21 is specifically configured to send the first information in at least one of the first or second one of first time units in the subframe a, and the receiving unit 22 is specifically configured to receive the second information in the subframe a+3, a being the subframe index number and the value of a being 4 or 9;

and/or, the sending end device being applied to a TDD uplink/downlink configuration 3, the sending unit 21 is specifically configured to send the first information in at least one of the first or second one of first time units in the subframe a, and the receiving unit 22 is specifically configured to receive the second information in the subframe a+7, a being the subframe index number and the value of a being 5;

and/or, the sending end device being applied to the TDD uplink/downlink configuration 3, the sending unit 21 is specifically configured to send the first information in at least one of the first or second one of first time units in the subframe a, and the receiving unit 22 is specifically configured to receive the second information in the subframe a+6, a being the subframe index number and the value of a being 6;

and/or, the sending end device being applied to the TDD uplink/downlink configuration 3, the sending unit 21 is specifically configured to send the first information in at least one of the first or second one of first time units in the subframe a, and the receiving unit 22 is specifically configured to receive the second information in a subframe a+5, a being the subframe index number and the value of a being 7;

and/or, the sending end device being applied to the TDD uplink/downlink configuration 3, the sending unit 21 is specifically configured to send the first information in at least one of the first or second one of first time units in the subframe a, and the receiving unit 22 is specifically configured to receive the second information in the subframe a+4, a being the subframe index number and the value of a being 8;

and/or, the sending end device being applied to the TDD uplink/downlink configuration 3, the sending unit 21 is specifically configured to send the first information in at least one of the first or second one of first time units in the subframe a, and the receiving unit 22 is specifically configured to receive the second information in the subframe a+3, a being the subframe index number and the value of a being 9;

and/or, the sending end device being applied to the TDD uplink/downlink configuration 3, the sending unit 21 is specifically configured to send the first information in the first one of first time units in the subframe a, and the receiving unit 22 is specifically configured to receive the second information in the subframe a+2, a being the subframe index number and the value of a being 0 or 1;

and/or, the sending end device being applied to the TDD uplink/downlink configuration 3, the sending unit 21 is specifically configured to send the first information in the second one of first time units in the subframe a, and the receiving unit 22 is specifically configured to receive the second information in the subframe a+3, a being the subframe index number and the value of a being 0 or 1;

and/or, the sending end device being applied to a TDD uplink/downlink configuration 4, the sending unit 21 is specifically configured to send the first information in the second one of first time units in the subframe a, and the receiving unit 22 is specifically configured to receive the second information in a subframe a+11, a being the subframe index number and the value of a being 1;

and/or, the sending end device being applied to the TDD uplink/downlink configuration 4, the sending unit 21 is specifically configured to send the first information in at least one of the first or second one of first time units in the subframe a, and the receiving unit 22 is specifically configured to receive the second information in a subframe a+8, a being the subframe index number and the value of a being 4;

and/or, the sending end device being applied to the TDD uplink/downlink configuration 4, the sending unit 21 is specifically configured to send the first information in at least one of the first or second one of first time units in the subframe a, and the receiving unit 22 is specifically configured to receive the second information in the subframe a+7, a being the subframe index number and the value of a being 5;

and/or, the sending end device being applied to the TDD uplink/downlink configuration 4, the sending unit 21 is specifically configured to send the first information in at least one of the first or second one of first time units in the subframe a, and the receiving unit 22 is specifically configured to receive the second information in the subframe a+6, a being the subframe index number and the value of a being 6;

and/or, the sending end device being applied to the TDD uplink/downlink configuration 4, the sending unit 21 is specifically configured to send the first information in at least one of the first or second one of first time units in the subframe a, and the receiving unit 22 is specifically configured to receive the second information in the subframe a+5, a being the subframe index number and the value of a being 7;

and/or, the sending end device being applied to the TDD uplink/downlink configuration 4, the sending unit 21 is specifically configured to send the first information in at least one of the first or second one of first time units in the subframe a, and the receiving unit 22 is specifically configured to receive the second information in the subframe a+4, a being the subframe index number and the value of a being 8;

and/or, the sending end device being applied to the TDD uplink/downlink configuration 4, the sending unit 21 is specifically configured to send the first information in at least one of the first or second one of first time units in the subframe a, and the receiving unit 22 is specifically configured to receive the second information in the subframe a+3, a being the subframe index number and the value of a being 9;

and/or, the sending end device being applied to the TDD uplink/downlink configuration 4, the sending unit 21 is specifically configured to send the first information in the first one of first time units in the subframe a, and the receiving unit 22 is specifically configured to receive the second information in the subframe a+2, a being the subframe index number and the value of a being 0 or 1;

and/or, the sending end device being applied to a TDD uplink/downlink configuration 5, the sending unit 21 is specifically configured to send the first information in the second one of first time units in the subframe a, and the receiving unit 22 is specifically configured to receive the second information in a subframe a+12, a being the subframe index number and the value of a being 0;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in the subframe a+11, a being the subframe index number and the value of a being 1;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in a subframe a+9, a being the subframe index number and the value of a being 3;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in the subframe a+8, a being the subframe index number and the value of a being 4;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in the subframe a+7, a being the subframe index number and the value of a being 5;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in the subframe a+6, a being the subframe index number and the value of a being 6;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in the subframe a+5, a being the subframe index number and the value of a being 7;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in the subframe a+4, a being the subframe index number and the value of a being 8;

and/or, the sending end device being applied to the TDD uplink/downlink configuration 5, the sending unit 21 is specifically configured to send the first information in at least one of the first or second one of first time units in the subframe a, and the receiving unit 22 is specifically configured to receive the second information in the subframe a+3, a being the subframe index number and the value of a being 9;

and/or, the sending end device being applied to the TDD uplink/downlink configuration 5, the sending unit 21 is specifically configured to send the first information in the first one of first time units in the subframe a, and the receiving unit 22 is specifically configured to receive the second information in the subframe a+2, a being the subframe index number and the value of a being 0;

and/or, the sending end device being applied to a TDD uplink/downlink configuration 6, the sending unit 21 is specifically configured to send the first information in the first one of first time units in the subframe a, and the receiving unit 22 is specifically configured to receive the second information in the subframe a+2, a being the subframe index number and the value of a being one of 0, 1, 5 or 6;

and/or, the sending end device being applied to the TDD uplink/downlink configuration 6, the sending unit 21 is specifically configured to send the first information in the second one of first time units in the subframe a, and the receiving unit 22 is specifically configured to receive the second information in the subframe a+3, a being the subframe index number and the value of a being one of 0, 1 or 5;

and/or, the sending end device being applied to the TDD uplink/downlink configuration 6, the sending unit 21 is specifically configured to send the first information in the second one of first time units in the subframe a, and the receiving unit 22 is specifically configured to receive the second information in the subframe a+6, a being the subframe index number and the value of a being 6;

and/or, the sending end device being applied to the TDD uplink/downlink configuration 6, the sending unit 21 is specifically configured to send the first information in at least one of the first or second one of first time units in the subframe a, and the receiving unit 22 is specifically configured to receive the second information in the subframe a+3, a being the subframe index number and the value of a being 9.

In the embodiment of the disclosure, alternatively, the sending unit 21 is specifically configured to send downlink data to the receiving end device on a PDSCH in the first time unit, wherein the receiving unit 22 is specifically configured to receive feedback information sent by the receiving end device in the second time unit, the feedback information being configured to indicate whether the receiving end device successfully receives the downlink data or not.

In the embodiment of the disclosure, alternatively, the sending unit 21 is specifically configured to send downlink control signaling to the receiving end device in the first time unit, the downlink control signaling being configured to schedule transmission of uplink data of the receiving end device, wherein the receiving unit 22 is specifically configured to receive the uplink data sent by the receiving end device on a PUSCH in the second time unit.

It should be understood that the sending end device 20 according to the embodiment of the disclosure may correspondingly execute the information transmission method 100 in the embodiments of the disclosure, and the abovementioned and other operations and/or functions of each unit in the sending end device 10 are intended to implement the corresponding flows executed by the sending end device in the method illustrated in FIG. 1, and for briefness, will not be elaborated herein.

Figure 20:
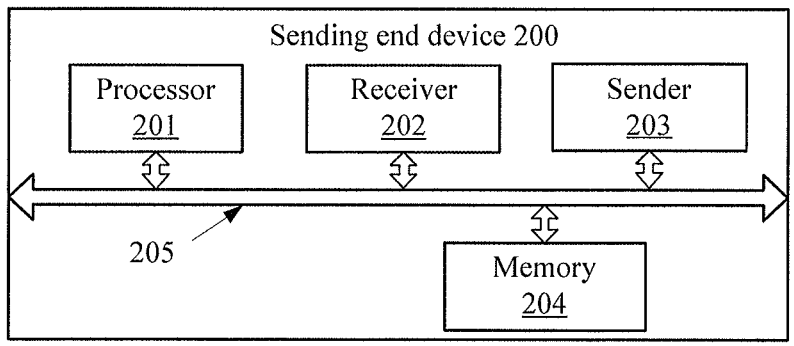
FIG. 20 is a schematic block diagram of a sending end device according to another embodiment of the disclosure.

It is important to note that, in the embodiment of the disclosure, the sending unit 21 may be implemented by a sender, and the receiving unit 22 may be implemented by a receiver. As illustrated in FIG. 20, the sending end device 200 may include a processor 201, a receiver 202, a sender 203 and a memory 204, wherein the memory 204 may be configured to store a code executed by the processor 201 and the like.

Each component in the sending end device 200 is coupled together through a bus system 205, wherein the bus system 205 includes a data bus, and further includes a power bus, a control bus and a state signal bus.

It should be understood that the sending end device 200 according to the embodiment of the disclosure may corresponding to the sending end device 20 in the embodiments of the disclosure, and may correspond to a corresponding body executing the method according to the embodiments of the disclosure, which, for briefness, will not be elaborated herein.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly learn about that specific processes of the system, device and unit described above may refer to the corresponding processes in the method embodiments for convenient and brief description and will not be elaborated herein.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a related art or part of the technical solutions may be embodied in form of software product, and the computer software product is stored in a storage medium, including a plurality of instructions configured to enable a piece of computer equipment (which may be a personal computer, a server, network equipment or the like) to execute all or part of the operations of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An information transmission method, comprising:
receiving, by a receiving end device, first information sent by a sending end device in a first time unit; and
sending, by the receiving end device, second information corresponding to the first information to the sending end device in a second time unit, wherein a duration of the first time unit is less than that of the second time unit,
wherein a subframe is consisted of six first time units, an ending moment of an ith first time unit in the six first time units is before a starting moment of an (i+1)th first time unit, or, the ending moment of the ith first time unit is the starting moment of the (i+1)th first time unit, wherein i is a positive integer and $1 \leq i \leq 5$; and
a subframe is consisted of two second time units, an ending moment of a kth second time unit in the two second time units is before a starting moment of a (k+1)th second time unit, or, the ending moment of the kth second time unit in the two second time units is the starting moment of the (k+1)th second time unit, wherein k is equal to 1;
wherein when the method is applied to a Frequency Division Duplexing (FDD) system,
wherein receiving, by the receiving end device, the first information sent by the sending end device in the first time unit and sending, by the receiving end device, the second information corresponding to the first information to the sending end device in the second time unit comprise at least one of the following:
sending, by the receiving end device, the second information to the sending end device in the first one of two second time units in a subframe a+1 in response to receiving, by the receiving end device, the first information in any one of first three first time units in a subframe a, a being the subframe index number;
or,
sending, by the receiving end device, the second information to the sending end device in the second one of two second time units in the subframe a+1 in response to receiving, by the receiving end device, the first information in any one of last three first time units in the subframe a, a being the subframe index number.

2. The method according to claim 1, wherein the second time unit is a first one of second time units after a target time length since a starting moment of the first time unit, wherein the target time length is an integral multiple of the duration of the first time unit.

3. The method according to claim 1, wherein receiving, by the receiving end device, the first information sent by the sending end device in the first time unit comprises:
   receiving, by the receiving end device, downlink data sent by the sending end device on a Physical Downlink Shared Channel (PDSCH) in the first time unit,
   wherein sending, by the receiving end device, the second information corresponding to the first information to the sending end device in the second time unit comprises:
   sending, by the receiving end device, feedback information to the sending end device in the second time unit, the feedback information being configured to indicate whether the receiving end device successfully receives the downlink data.

4. The method according to claim 1, wherein receiving, by the receiving end device, the first information sent by the sending end device in the first time unit comprises:
   receiving, by the receiving end device, downlink control signaling sent by the sending end device in the first time unit, the downlink control signaling being configured to schedule transmission of uplink data of the receiving end device,
   wherein sending, by the receiving end device, the second information corresponding to the first information to the sending end device in the second time unit comprises:
   sending, by the receiving end device, the uplink data to the sending end device on a Physical uplink Shared Channel (PUSCH) in the second time unit.

5. An information transmission method, comprising:
   sending, by a sending end device, first information to a receiving end device in a first time unit; and
   receiving, by the sending end device, second information corresponding to the first information from the receiving end device in a second time unit, wherein a duration of the first time unit is less than that of the second time unit,
   wherein a subframe is consisted of six first time units, an ending moment of an ith first time unit in the six first time units is before a starting moment of an (i+1)th first time unit, or, the ending moment of the ith first time unit is the starting moment of the (i+1)th first time unit, wherein i is a positive integer and 1≤i≤5; and
   a subframe is consisted of two second time units, an ending moment of a kth second time unit in the two second time units is before a starting moment of a (k+1)th second time unit, or, the ending moment of the kth second time unit in the two second time units is the starting moment of the (k+1)th second time unit, wherein k is equal to 1;
   wherein when the method is applied to a Frequency Division Duplexing (FDD) system,
   wherein sending, by the sending end device, the first information to the receiving end device in the first time unit and receiving, by the sending end device, the second information corresponding to the first information from the receiving end device in the second time unit comprise at least one of the following:
   receiving, by the sending end device, the second information in the first one of two second time units in a subframe a+1 in response to sending, by the sending end device, the first information in any one of first three first time units in a subframe a, a being the subframe index number;
   or,
   receiving, by the sending end device, the second information in the second one of two second time units in the subframe a+1 in response to sending, by the sending end device, the first information in any one of last three first time units in the subframe a, a being the subframe index number.

6. The method according to claim 5, wherein the second time unit is a first one of second time units after a target time length since a starting moment of the first time unit, wherein the target time length is an integral multiple of the duration of the first time unit.

7. The method according to claim 5, wherein sending, by the sending end device, the first information to the receiving end device in the first time unit comprises:
   sending, by the sending end device, downlink data to the receiving end device on a Physical Downlink Shared Channel (PDSCH) in the first time unit,
   wherein receiving, by the sending end device, the second information corresponding to the first information from the receiving end device in the second time unit comprises:
   receiving, by the sending end device, feedback information sent by the receiving end device in the second time unit, the feedback information being configured to indicate whether the receiving end device successfully receives the downlink data.

8. The method according to claim 5, wherein sending, by the sending end device, the first information to the receiving end device in the first time unit comprises:
   sending, by the sending end device, downlink control signaling to the receiving end device in the first time unit, the downlink control signaling being configured to schedule transmission of uplink data of the receiving end device,
   wherein receiving, by the sending end device, the second information corresponding to the first information from the receiving end device in the second time unit comprises:
   receiving, by the sending end device, the uplink data sent by the receiving end device on a Physical Uplink Shared Channel (PUSCH) in the second time unit.

9. A receiving end device, comprising: a memory, a processor, and a computer program stored on the memory and capable of running on the processor, wherein the computer program, when executed by the processor, causes the processor to execute operations comprising:
   receiving first information sent by a sending end device in a first time unit; and
   sending second information corresponding to the first information to the sending end device in a second time unit, wherein a duration of the first time unit is less than that of the second time unit,
   a subframe is consisted of six first time units, an ending moment of an ith first time unit in the six first time units is before a starting moment of an (i+1)th first time unit, or, the ending moment of the ith first time unit is the starting moment of the (i+1)th first time unit, wherein i is a positive integer and 1≤i≤5; and
   a subframe is considered of two second time units, an ending moment of a kth second time unit in the two second time units is before a starting moment of a (k+1)th second time unit, or, the ending moment of the kth second time unit in the two second time units is the starting moment of the (k+1)th second time unit, wherein k is equal to 1;

wherein when the receiving end device is applied to a Frequency Division Duplexing (FDD) system, wherein receiving first information sent by a sending end device in a first time unit; and sending second information corresponding to the first information to the sending end device in a second time unit comprises at least one of the following:

sending the second information to the sending end device in the first one of two second time units in a subframe a+1 in response to receiving the first information in any one of first three first time units in a subframe a, a being the subframe index number;

or, sending the second information to the sending end device in the second one of two second time units in the subframe a+1 in response to receiving the first information in any one of last three first time units in the subframe a, a being the subframe index number.

10. The receiving end device according to claim 9, wherein the second time unit is a first one of second time units after a target time length since a starting moment of the first time unit, wherein the target time length is an integral multiple of the duration of the first time unit.

11. The receiving end device according to claim 9, wherein receiving the first information sent by the sending end device in the first time unit comprises:

receiving downlink data sent by the sending end device on a Physical Downlink Shared Channel (PDSCH) in the first time unit, wherein sending the second information corresponding to the first information to the sending end device in the second time unit comprises:

sending feedback information to the sending end device in the second time unit, the feedback information being configured to indicate whether the receiving end device successfully receives the downlink data.

12. The receiving end device according to claim 9, wherein receiving the first information sent by the sending end device in the first time unit comprises:

receiving downlink control signaling sent by the sending end device in the first time unit, the downlink control signaling being configured to schedule transmission of uplink data of the receiving end device, wherein sending the second information corresponding to the first information to the sending end device in the second time unit comprises:

sending the uplink data to the sending end device on a Physical Uplink Shared Channel (PUSCH) in the second time unit.

* * * * *